United States Patent
Qiu et al.

(10) Patent No.: US 12,360,532 B2
(45) Date of Patent: Jul. 15, 2025

(54) LATENT BELIEF SPACE PLANNING USING A TRAJECTORY TREE

(71) Applicant: isee, Cambridge, MA (US)

(72) Inventors: Dicong Qiu, Pittsburgh, PA (US); Yibiao Zhao, Cambridge, MA (US); Chris L. Baker, Pittsburgh, PA (US)

(73) Assignee: ISEE, Cambridge, MA (US)

( * ) Notice: Subject to any disclaimer, the term of this patent is extended or adjusted under 35 U.S.C. 154(b) by 293 days.

(21) Appl. No.: 16/994,040

(22) Filed: Aug. 14, 2020

(65) Prior Publication Data

US 2021/0048823 A1 Feb. 18, 2021

Related U.S. Application Data

(60) Provisional application No. 62/887,996, filed on Aug. 16, 2019.

(51) Int. Cl.
*G05D 1/00* (2024.01)
*B62D 6/00* (2006.01)
*G05B 19/042* (2006.01)

(52) U.S. Cl.
CPC ............ *G05D 1/0212* (2013.01); *B62D 6/00* (2013.01); *G05B 19/042* (2013.01); *G05D 1/0088* (2013.01); *G05B 2219/2637* (2013.01)

(58) Field of Classification Search
CPC .............................. B62D 6/00; G05B 19/042; G05B 2219/2637; G05B 2219/32388;
(Continued)

(56) References Cited

U.S. PATENT DOCUMENTS 5,438,517 A 8/1995 Sennott et al.
7,119,673 B2 10/2006 Eager et al.
(Continued)

FOREIGN PATENT DOCUMENTS

WO 1991009375 A1 6/1991

OTHER PUBLICATIONS

Agha-Mohammadi et al., "FIRM: Feedback controller-based information-state roadmap—a framework for motion planning under uncertainty", 2011 IEEE/RSJ International Conference on Intelligent Robots and Systems, pp. 4284-4291, 2011.
(Continued)

*Primary Examiner* — Matthew J. Reda
(74) *Attorney, Agent, or Firm* — Lando & Anastasi, LLP

(57) ABSTRACT

Techniques for latent belief space planning include: during execution of an autonomous agent configured to control operation of a physical mechanism, obtaining a current observation of a physical environment; based at least on the current observation of the physical environment, generating a trajectory tree that represents possible trajectories in a belief space, wherein nodes of the trajectory tree represent values of a continuous observation, a continuous state, and a continuous control, each node being associated with one of multiple timesteps along the plurality of possible trajectories, and wherein branches from inner nodes to child nodes correspond to possible outcomes and observations of a multi-modal latent state; determining a current value of the continuous control associated with a current node; and applying the current value of the continuous control to operation of the physical mechanism.

22 Claims, 11 Drawing Sheets

(58) Field of Classification Search
CPC ....... G05B 2219/45018; G05D 1/0088; G05D 1/0212; G05D 2201/0213
See application file for complete search history.

(56) References Cited

U.S. PATENT DOCUMENTS

| | | | |
|---|---|---|---|
| 8,195,394 | B1 | 6/2012 | Zhu et al. |
| 8,364,334 | B2 | 1/2013 | Au et al. |
| 8,421,611 | B1 | 4/2013 | Coshow et al. |
| 8,978,562 | B2 | 3/2015 | Nagamine et al. |
| 9,211,889 | B1 | 12/2015 | Hoetzer et al. |
| 9,274,522 | B2 | 3/2016 | Boos et al. |
| 9,283,935 | B2 | 3/2016 | Fujioka |
| 9,459,622 | B2 | 10/2016 | Abhyanker |
| 9,592,964 | B2 | 3/2017 | Göllü |
| 9,623,859 | B2 | 4/2017 | Lavoie et al. |
| 9,656,691 | B2 | 5/2017 | Heimberger et al. |
| 10,065,317 | B2 | 9/2018 | Tan et al. |
| 10,081,504 | B2 | 9/2018 | Walford et al. |
| 10,156,848 | B1 | 12/2018 | Konrardy et al. |
| 10,245,993 | B1 | 4/2019 | Brady et al. |
| 10,259,477 | B2 | 4/2019 | LeFebvre et al. |
| 10,300,601 | B2 | 5/2019 | Tan et al. |
| 11,269,359 | B2 | 3/2022 | Wieschemann et al. |
| 11,300,969 | B2 | 4/2022 | Balogh et al. |
| 11,441,916 | B1 | 9/2022 | Konrardy et al. |
| 2004/0182619 | A1 | 9/2004 | McGregor et al. |
| 2004/0267411 | A1 | 12/2004 | Mayer et al. |
| 2005/0216181 | A1* | 9/2005 | Estkowski ............ G08G 1/166 340/995.23 |
| 2006/0145853 | A1 | 7/2006 | Richards et al. |
| 2006/0158752 | A1 | 7/2006 | Perkes |
| 2006/0181391 | A1 | 8/2006 | McNeill et al. |
| 2009/0030574 | A1* | 1/2009 | Yamakado ............ B60W 50/16 701/44 |
| 2010/0163621 | A1* | 7/2010 | Ben-Asher ............ G05D 1/104 235/412 |
| 2010/0289623 | A1 | 11/2010 | Roesner |
| 2012/0010772 | A1* | 1/2012 | Pack ................... G05D 1/0274 701/27 |
| 2013/0253753 | A1 | 9/2013 | Burnette et al. |
| 2014/0222971 | A1 | 8/2014 | Cooper et al. |
| 2015/0294166 | A1 | 10/2015 | Kuehnle et al. |
| 2015/0336502 | A1* | 11/2015 | Hillis ................... G05D 1/0088 701/23 |
| 2016/0031482 | A1 | 2/2016 | Lavoie |
| 2017/0043967 | A1 | 2/2017 | Walford et al. |
| 2017/0061804 | A1* | 3/2017 | Navarro Felix ..... G05D 1/0202 |
| 2017/0323249 | A1 | 11/2017 | Khasis |
| 2018/0089563 | A1* | 3/2018 | Redding ................. G06N 5/01 |
| 2018/0265130 | A1* | 9/2018 | Derendarz ......... B62D 15/0285 |
| 2018/0304468 | A1 | 10/2018 | Holz |
| 2018/0306587 | A1 | 10/2018 | Holz |
| 2019/0018412 | A1* | 1/2019 | Tschanz .............. B60W 60/001 |
| 2019/0084549 | A1 | 3/2019 | Dagan |
| 2019/0146500 | A1* | 5/2019 | Yalla ....................... H03H 17/04 701/25 |
| 2020/0086482 | A1* | 3/2020 | Johnson ................ B25J 13/088 |
| 2020/0327358 | A1* | 10/2020 | Farhi ...................... G06F 17/18 |
| 2021/0046953 | A1* | 2/2021 | Indelman ................ G06N 7/01 |
| 2021/0205984 | A1* | 7/2021 | Hafner .................... G06N 7/01 |

OTHER PUBLICATIONS

Astrom, Introduction to Stochastic Control Theory, Chapter 8, Academic Press, 1970.

Bai et al., "Intention-aware online POMDP planning for autonomous driving in a crowd", IEEE International Conference pn Robotics and Automation (ICRA), pp. 454-460, 2015.

Brunskill et al., "Continuous-state POMDPs with hybrid dynamics", International symposium on artificial intelligence and mathematics (ISAIM), 2008.

Bry et al., "Rapidly-exploring random belief trees for motion planning under uncertainty", IEEE Conference on Robotics and Automation (ICRA), 2011.

Cadena et al., "Past, present, and future of simultaneous localization and mapping: Towards the robust-perception age", Trans. Rob., 32(6):1309-1332, Dec. 2016.

Cai et al., "HyP-Despot: A hybrid parallel algorithm for online planning under uncertainty", Proc. Robotics: Science and Systems, 2018.

Chen et al., "POMDP-lite for robust robot planning under uncertainty", IEEE International Conference on Robotics and Automation, pp. 5427-5433, 2016.

Couëtoux et al., "Continuous upper confidence trees", Learning and Intelligent Optimization, 2011.

Erez et al., "A scalable method for solving high-dimensional continuous POMDPs using local approximation", Proceedings of the Twenty-Sixth Conference on Uncertainty in Artificial Intelligence, UAI'10, pp. 160-167, Arlington, Virginia, United States, 2010. AUAI Press.

Fisac et al., "Hierarchical game-theoretic planning for autonomous vehicles", International Conference on Robotics and Automation (ICRA), 2019.

Galceran et al., "Multipolicy decision-making for autonomous driving via changepoint-based behavior prediction: Theory and experiment", Autonomous Robots, 41(6):1367-1382, Aug. 2017.

Hardy et al., "Contingency planning over probabilistic obstacle predictions for autonomous road vehicles", IEEE Transactions on Robotics, 29(4):913-929, 2013.

Igl et al., "Deep variational reinforcement learning for POMDPs", Jennifer Dy and Andreas Krause, editors, Proceedings of the 35th International Conference on Machine Learning, vol. 80 of Proceedings of Machine Learning Research, pp. 2117-2126, Stockholmsmässan, Stockholm Sweden, Jul. 10-15, 2018. PMLR.

Indelman et al., "Planning in the continuous domain: A generalized belief space approach for autonomous navigation in unknown environments", The International Journal of Robotics Research, 34(7):849-882, 2015.

Jacobson, David H. and Mayne, David Q., Differential dynamic programming, Chapters 1, 4, 5, 6, and 7, Elsevier, New York, 1970.

Jain et al., "Belief space planning under approximate hybrid dynamics", Robotics: Science and Systems Workshop on POMDPs in Robotics, 2017.

Kaelbling et al., "Planning and acting in partially observable stochastic domains", Artificial Intelligence, 101:99-134, 1998.

Kavraki et al., "Probabilistic roadmaps for path planning in high-dimensional configuration spaces", IEEE Transactions on Robotics and Automation, 12(4):566-580, 1996.

Kurniawati et al., "Sarsop: Efficient point-based POMDP planning by approximating optimally reachable belief spaces", Proc. Robotics: Science and Systems, 2008.

McAllister et al., "Data-efficient reinforcement learning in continuous state-action Gaussian-POMDPs", I. Guyon, U. V. Luxburg, S. Bengio, H. Wallach, R. Fergus, S. Vishwanathan, and R. Garnett, editors, Advances in Neural Information Processing Systems 30, pp. 2040-2049, Curran Associates, Inc., 2017.

Nishimura et al., "SACBP: Belief space planning for continuous-time dynamical systems via stochastic sequential action control", The 13th International Workshop on the Algorithmic Foundations of Robotics (WAFR), 2018.

Ong et al., "POMDPs for robotic tasks with mixed observability", Robotics: Science and Systems, vol. 5, 2009.

Papadimitriou et al., "The complexity of markov decision processes", Mathematics of Operations Research, 12(3):441-450, 1987.

Patil et al., "Scaling up Gaussian Belief Space Planning Through Covariance-Free Trajectory Optimization and Automatic Differentiation", Springer International Publishing, Cham, 2015, pp. 515-533.

Platt Jr. et al., "Belief space planning assuming maximum likelihood observations", Proceedings of the Robotics: Science and Systems Conference, 6th, 2010.

Porta et al., "Point-based value iteration for continuous POMDPs", Journal of Machine Learning Research, 7:2329-2367, 2006.

(56) References Cited

OTHER PUBLICATIONS

Sadigh et al., "Planning for autonomous cars that leverage effects on human actions", Proceedings of Robotics: Science and Systems (RSS), 2016.
Schwarting et al., "Social behavior for autonomous vehicles", Proceedings of the National Academy of Sciences, 2019.
Seiler et al., "An online and approximate solver for POMDPs with continuous action space", IEEE International Conference on Robotics and Automation (ICRA), pp. 2290-2297, 2015.
Silver et al., "Monte-Carlo Planning in Large POMDPs", J. D. Lafferty, C. K. I. Williams, J. Shawe-Taylor, R. S. Zemel, and A. Culotta, editors, Advances in Neural Information Processing Systems 23, pp. 2164-2172, 2010.
Somani et al., "Despot: Online POMDP planning with regularization", Journal of Artificial Intelligence Research, 58:231-266, 2017.
Sunberg et al., "The value of inferring the internal state of traffic participants for autonomous freeway driving", American Control Conference, 2017.
Tassa et al., "Synthesis and stabilization of complex behaviors through online trajectory optimization", IEEE/RSJ International Conference on Intelligent Robots and Systems, 2012.
Todorov et al., "A generalized iterative LQG method for locally-optimal feedback control of constrained nonlinear stochastic systems", American Control Conference, pp. 300-306, 2005.
Trautman et al., "Unfreezing the robot: Navigation in dense, interacting crowds", IEEE/RSJ International Conference on Intelligent Robots and Systems, pp. 797-803, 2010.
Van Den Berg et al., "LQG-MP: Optimized path planning for robots with motion uncertainty and imperfect state information", International Journal of Robotics Research, 30(7):895-913, 2011.
Van Den Berg et al., "Motion planning under uncertainty using differential dynamic programming in belief space", Robotics Research, pp. 473-490. Springer, 2017.
Van Den Berg et al., "Motion planning under uncertainty using iterative local optimization in belief space", The International Journal of Robotics Research, 31:1263-1278, 2012.
Bersekas, Dynamic Programming and Optimal Control, Athena Scientific, Belmont, Massachusetts, 4 edition, 2017.

\* cited by examiner

Algorithm 502

```
Algorithm 1: PODDPFORWARDPASS(x_0, b_0, U_nom, S_nom, k, K, α, Z, T)
1   U ← [];                          // initialize control map indexed by histories
2   S('Root') ← [x_0, b_0];          // initialize belief state map indexed by histories
3   FORWARDTREE('Root', U, S, U_nom, S_nom, ∅, ∅, α, Z, T, 1);  // trajectory tree recursion
4   return U, S;                     // return updated trajectory tree
5   Procedure FORWARDTREE(H, U, S, U_nom, S_nom, k, K, α, Z, T, d)
6       if k(H), K(H) ≠ ∅ then                                  // apply control updates
7         │  U(H) ← U_nom(H) + αk(H) + K(H)(S(H) − S_nom(H));
8       else
9         │  U(H) ← U_nom(H);
10      for z ∈ Z do
11        │  [x_H, b_H] ← S(H);
12        │  x' = arg max_x p(x|x_H, U(H), z);                  // assume ML state transition
13        │  o' = arg max_o p(o|x', z);                         // assume ML observation
14        │  b' = BELIEFUPDATE(o', x', U(H), x_H, b_H);
15        │  S([H, z]) ← [x', b'];                              // append new belief state to history
16        │  if d < T then
17        │    │  FORWARDTREE([H, z], U, S, U_nom, X_nom, k, K, α, Z, T, d+1);  // recurse
```

FIG. 5A

Algorithm 504

```
Algorithm 2: PODDPBackwardPass(U, S, Z, T)
1  k, K ← [];                          // initialize control update maps indexed by histories
2  BackwardTree('Root', k, K, U, S, Z, T, 1);   // compute control updates recursively
3  return k, K;                        // return control updates
4  Procedure BackwardTree(H, k, K, u, S, Z, T, d)
5  |  Δ ← [];                          // initialize backward derivatives map
6  |  for z ∈ Z do
7  |  |  if d < T then                 // recursively compute backward derivatives and updates
8  |  |  |  Δ(z) ← BackwardTree([H, z], k, K, U, S, Z, T, d);
9  |  |  else                          // set backward derivatives as empty
10 |  |  |  Δ(z) ← ∅;
11 |  $k_H, K_H, Δ_H$ ← OptimizeControl(U(H), S(H), Δ, Z);
12 |  k(H), K(H) ← $k_H, K_H$;         // update control update maps
13 |  return $Δ_H$;                    // return backward derivatives
```

FIG. 5B

LATENT BELIEF SPACE PLANNING USING A TRAJECTORY TREE

RELATED APPLICATIONS

This application claims the benefit of U.S. Provisional Patent Application Ser. No. 62/887,996, titled "PODDP: Partially Observable Differential Dynamic Programming For Latent Belief Space Planning," filed Aug. 16, 2019, which is hereby incorporated by reference.

BACKGROUND

An autonomous agent is a set of hardware and/or software configured to control a physical mechanism. For example, a vehicle (e.g., automobile, aircraft, or water vehicle) may include an autonomous agent that controls steering, braking, acceleration, and/or some other physical mechanism of the vehicle, allowing the vehicle to be wholly or partially self-driving. Many different kinds of autonomous agents exist. An autonomous agent receives information about the physical environment from one or more sensors and uses the information to help determine how to control the physical mechanism. For example, if data from a sensor indicates an obstruction in the path of a self-driving vehicle, an autonomous agent may instruct the vehicle to brake and/or turn.

In many cases, autonomous agents are required to operate in situations where the state of the environment is uncertain. The ability to handle such situations is generally considered a critical goal of autonomous agents, particularly in situations involving potentially high stakes (e.g., loss of life and/or valuable cargo). For example, noisy actuators, imperfect sensors, and perceptual limitations such as occlusion can contribute to the uncertainty that autonomous agents face. Even if perfect sensors and perception were possible, some latent states of the environment would remain opaque, such as whether a cookie jar is empty or whether another driver intends to yield. To plan under such uncertainty, autonomous agents typically seek to balance the cost of exploratory actions with the potential benefit of gaining additional information about the environment. However, the problem of planning under partial observability, which can be formalized as a partially observable Markov decision process (POMDP) is generally intractable.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to autonomous agents used to control the operation of physical mechanisms.

SUMMARY

In general, in one aspect, one or more non-transitory computer-readable media store instructions that, when executed by one or more processors, cause the one or more processors to perform operations. The operations include: during execution of an autonomous agent configured to control operation of a physical mechanism, obtaining a current observation of a physical environment; based at least on the current observation of the physical environment, generating a trajectory tree that represents possible trajectories in a belief space, wherein nodes of the trajectory tree represent values of a continuous observation, a continuous state, and a continuous control, each node being associated with one of multiple timesteps along the possible trajectories, and wherein branches from inner nodes to child nodes correspond to possible outcomes and observations of a multi-modal latent state; determining a current value of the continuous control associated with a current node; and applying the current value of the continuous control to operation of the physical mechanism.

Generating the trajectory tree may include: (a) in a first forward pass, initializing the values of the continuous control for the nodes; (b) in a backward pass, starting at leaf nodes, propagating results of a derivative function through parent nodes; and (c) in a second forward pass, applying an optimization function to values of the continuous control, based at least on the results of the derivative function. Operations (b) and (c) may be repeated iteratively until an optimization termination criterion is satisfied.

The first forward pass may include generating the nodes at least by: (i) generating a root node of the trajectory tree, based at least on the current observation; (ii) determining maximum likelihood outcomes for modes of the multi-modal latent state associated with the current observation; (iii) determining maximum likelihood observations associated with the maximum likelihood outcomes; (iv) generating child nodes of the root node, corresponding to the maximum likelihood outcomes and maximum likelihood observations; and (v) performing (ii), (iii), and (iv) recursively, starting at the child nodes of the root node, until a finite horizon is reached.

The first forward pass may include generating the nodes at least by: (i) generating a root node of the trajectory tree, based at least on the current observation; (ii) sampling possible outcomes from a belief distribution associated with the current observation; (iii) sampling possible observations associated with the possible outcomes; (iv) generating child nodes of the root node, corresponding to the possible outcomes and possible observations; and (v) performing (ii), (iii), and (iv) recursively, starting at the child nodes of the root node, until a finite horizon is reached.

Generating the trajectory tree may include updating values in a preexisting data structure that represents the trajectory tree.

Timesteps associated with the nodes may be separated by time intervals that are greater than a sampling rate used by one or more autonomous agent sensors providing values of the continuous observation.

The continuous state may be a partially-observable continuous state.

The multi-modal latent state may be bimodal or have more than two modes,

The physical mechanism may be a steering mechanism of a vehicle.

In general, in one aspect, one or more non-transitory computer-readable media store instructions that, when executed by one or more processors, cause the one or more processors to perform operations. The operations include: during execution of an autonomous agent configured to control operation of a physical mechanism, generating a trajectory tree that represents possible trajectories in a belief space, wherein nodes of the trajectory tree represent values of a continuous observation, a continuous state, and a continuous control, each node being associated with one of multiple timesteps along the possible trajectories, and wherein branches from inner nodes to child nodes correspond to possible outcomes and observations of a multi-modal latent state; determining that a current observation corresponds most closely to a closest-fit node; obtaining a current value of the continuous control associated with the closest-fit node; and applying the current value of the continuous control to operation of the physical mechanism.

Generating the trajectory tree may include: (a) in a first forward pass, initializing the values of the continuous control for the nodes; (b) in a backward pass, starting at leaf nodes, propagating results of a derivative function through parent nodes; and (c) in a second forward pass, applying an optimization function to values of the continuous control, based at least on the results of the derivative function. Operations (b) and (c) may be repeated iteratively until an optimization termination criterion is satisfied.

The first forward pass may include generating the nodes at least by: (i) generating a root node of the trajectory tree, based at least on an initial observation; (ii) determining maximum likelihood outcomes for modes of the multi-modal latent state associated with the initial observation; (iii) determining maximum likelihood observations associated with the maximum likelihood outcomes; (iv) generating child nodes of the root node, corresponding to the maximum likelihood outcomes and maximum likelihood observations; and (v) performing (ii), (iii), and (iv) recursively, starting at the child nodes of the root node, until a finite horizon is reached.

The first forward pass may include generating the nodes at least by: (i) generating a root node of the trajectory tree, based at least on an initial observation; (ii) sampling possible outcomes from a belief distribution associated with the initial observation; (iii) sampling possible observations associated with the possible outcomes; (iv) generating child nodes of the root node, corresponding to the possible outcomes and the possible observations; and (v) performing (ii), (iii), and (iv) recursively, starting at the child nodes of the root node, until a finite horizon is reached.

The operations may further include: adjusting the current value of the continuous control based at least on a difference between the current observation and a possible value of the continuous observation associated with the particular node.

Timesteps associated with the nodes may be separated by time intervals that are greater than a sampling rate used by one or more autonomous agent sensors providing values of the continuous observation.

The continuous state may be a partially-observable continuous state.

The multi-modal latent state may be bimodal or have more than two modes.

The physical mechanism may be a steering mechanism of a vehicle.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 5A illustrates an example of an algorithm for a forward pass according to an embodiment;

FIG. 5B illustrates an example of an algorithm for a backward pass according to an embodiment;

DETAILED DESCRIPTION

I. Introduction

Figure 1:
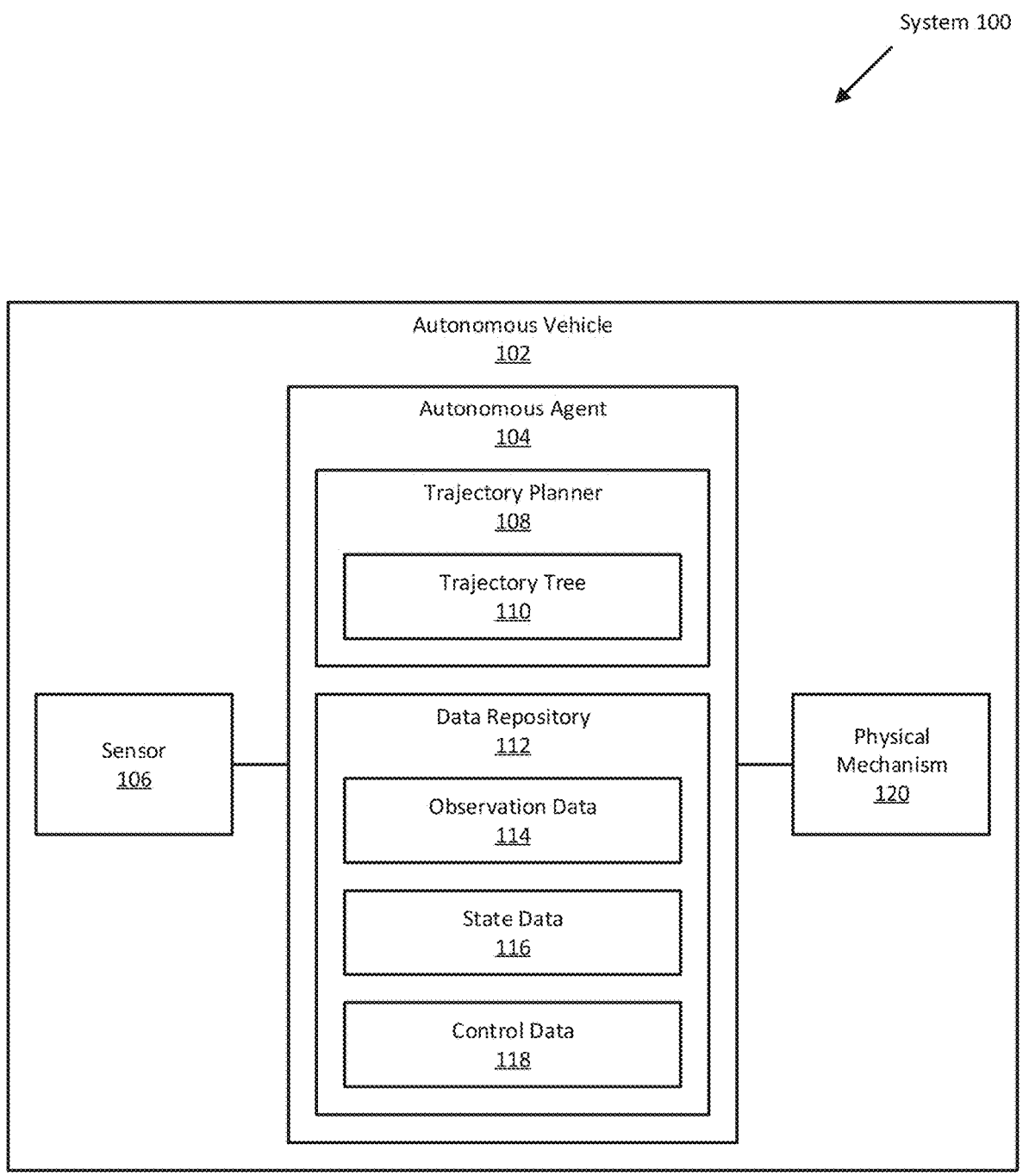
FIG. 1 is a block diagram of an example of a system according to an embodiment.

As noted above, the problem of planning under partial observability is generally intractable. Some trajectory optimization systems have been used in nonlinear model-predictive control architectures. However, those approaches typically require the state to be fully observable or separately estimated. Extensions of trajectory optimization techniques to belief space planning allow partial observability to be captured within continuous motion planning algorithms suitable for robotics applications. However, those approaches primarily consider unimodal Gaussian uncertainty (i.e., where a belief can be modeled as a Gaussian distribution having a single mode). Approaches that rely on Gaussian distributions have limited applicability to problems with multi-modal structure.

In practice, much of the uncertainty in the real (i.e., non-simulated) world is multi-modal in structure, such as: the presence or location of an object (e.g., a goal object or obstruction); the discrete mode of a system; the expected behavior of another person or agent (e.g., whether another vehicle will act aggressively or courteously); and many other kinds of problems faced by autonomous agents in the real world. Multi-modal structures can be represented within general POMDPs. However, optimizing continuous actions (e.g., for motion planning) is challenging even for state-of-the-art POMDP solvers.

One or more embodiments described herein include a trajectory optimization approach for solving nonlinear POMDPs involving continuous states, actions, and observations, with non-Gaussian beliefs over discrete latent variables. In some examples, this approach may be referred to as partially observable differential dynamic programming (PODDP). PODDP builds and optimizes a contingency plan over a tree of possible observations and trajectories in the belief space. Dynamic programming over the trajectory tree may include propagating an approximate value function through the belief state dynamics defined by observations and Bayesian belief updating. In addition, some examples include a hierarchical dynamic programming decomposition of the problem. This approach may be practical in various settings, including but not limited to robotics settings where receding horizon planning is applicable and where the control frequency may be higher than the observation frequency.

In general, approaches described herein allow for modeling and optimizing trajectories in many different scenarios, including several important classes of nonlinear, continuous planning problems with uncertainty over discrete latent states. (In this discussion, for ease of explanation in different contexts, a latent state may also be referred to as a hidden state, partially observable state, or discrete state.) Those classes of problems include: (1) tasks where the cost function depends on an uncertain latent state, e.g., where an agent must approach or avoid goals or obstacles that may be in a finite number of locations; (2) tasks where the dynamics are conditioned on the uncertain latent mode of the (hybrid) system, e.g., contact mode, component status, or environmental condition (e.g., smooth versus rough terrain); and (3) interactive tasks where other entities' trajectories impose dynamic costs and are influenced by their latent intentions. In this third class of problems, for example, autonomous driving systems must plan under uncertainty about other vehicles' interactive trajectories, conditioned on the other drivers' situational awareness level, intention to cooperate, etc.

II. System Architecture

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes an autonomous vehicle 102. The autonomous vehicle 102 may be a wholly autonomous vehicle configured to operate without any human guidance. Alternatively, the autonomous vehicle 102 may be a partially autonomous vehicle in which some aspects are automated and others remain under control of a human operator. Some examples of autonomous vehicles include, but are not limited to: a self-driving automobile designed to transport cargo and/or passengers (e.g., a self-driving tractor-trailer used to transport cargo over roads and/or within a cargo distribution facility); an aircraft (e.g., a cargo or passenger aircraft, a drone, or another kind of aircraft); a watercraft; a spacecraft; and an automated home appliance (e.g., a robotic vacuum cleaner). As used herein, the term "vehicle" should not be considered limited to craft used to transport cargo and/or passengers. The autonomous vehicle 102 includes one or more physical mechanism(s) 120 used to direct the autonomous vehicle 102's trajectory (including direction, acceleration, and/or speed), such as a steering mechanism, accelerator, brake, etc. A physical mechanism 120 may include a controller (not shown) that translates digital and/or analog instructions to physical motion (e.g., physically turning the wheels, increasing or decreasing acceleration, engaging a brake mechanism, etc.).

To help direct the autonomous vehicle 102's trajectory, the autonomous vehicle 102 includes one or more autonomous agent(s) 104 configured to control the operation of one or more of the physical mechanism(s) 120. For ease of discussion, the following description assumes a single autonomous agent 104; however, embodiments may be practiced with any number of autonomous agents 104. The autonomous agent 104 is configured to receive information about the physical environment from one or more sensors 106. For example, the sensor(s) 106 may include a radar sensor, lidar sensor, camera (i.e., configured to capture still images and/or video), microphone, thermometer, altitude sensor, global positioning system (GPS), and/or another kind of sensor configured to gather information about the physical environment. Information gathered by a sensor 106 may relate to the geospatial location of the autonomous vehicle 102, weather conditions, locations of static and/or mobile obstacles (e.g., other vehicles, pedestrians, terrain, overpasses, etc.), road markings, altitude, and/or other information relevant to the autonomous vehicle 102's location and trajectory in the physical environment.

The autonomous agent 104 includes a trajectory planner 108. Based at least in part on information from the sensor(s) 106, the trajectory planner 108 is configured to generate a trajectory tree 110 and use the trajectory tree 110 to plan a trajectory for the autonomous vehicle 102. Examples of operations for generating and using a trajectory tree 110 are described in further detail below. Based at least on the trajectory tree 110, the autonomous agent 104 is configured to control operation of the physical mechanism(s) 120. For example, the autonomous agent 104 may send a signal to a steering mechanism to adjust the autonomous vehicle 102's direction, to an accelerator to increase or decrease acceleration, and/or to a braking mechanism to apply the brakes. The autonomous agent 104 may be configured to control operation of many different kinds of physical mechanisms 120 in many different ways.

The trajectory tree 110 may be conceptualized as starting from a root node and branching "upward." The upward direction is also referred to herein as "forward." Connections between nodes of the trajectory tree 110 are referred to as "edges." A node that connects to one or more higher nodes is an "inner" node and may be referred to as a "parent" or "grandparent" (depending on the number of levels of separation) of the higher node(s). The root node is thus the innermost node. The higher node(s) is/are, in turn, the parent node's "child" node(s). A node that does not have any children is referred to as a "leaf" node. An "upward" or "forward" traversal (also referred to as a "pass") of the trajectory tree 104 begins at an inner node (e.g., the root node) and advances along edges toward the leaf node(s). A "downward" or "backward" traversal of the trajectory tree 104 begins at one or more leaf nodes and advances toward the root node. A traversal may be performed in many different ways, including but not limited to depth-first (i.e., traversing the full depth of one branch before proceeding to the next branch) or breadth-first (i.e., traversing all the nodes at a given level before proceeding to the next level). The trajectory tree 104 may be stored using many different kinds of data structures, including but not limited to object-oriented structures (e.g., with each node represented as an instance of a node object and referencing zero or more other node objects as child nodes) or an array. While examples described herein assume a strict tree data structure, some embodiments may include multiple root nodes and/or connections between nodes that form cycles, thus resulting in a data structure that cannot strictly be referred to as a tree. Embodiments should not be considered limited to the specific structure described in the included examples.

In an embodiment, each level of the trajectory tree 104 corresponds to a set of one or more states in belief space at a particular timestep. For example, if the system 100 uses a control frequency of 50 Hz, each level of the trajectory tree 104 may correspond to increments of $\frac{1}{50}^{th}$ of a second. In this example, the projected observation(s) and control(s) for a particular node correspond to a time $\frac{1}{50}^{th}$ of a second earlier than the time associated with its immediate child (ren). In some examples, the system 100 may use a control frequency of 1 Hz, 10 Hz, and/or another frequency. The system 100 may use different control frequencies for different physical mechanisms and/or may change a control frequency over time. The magnitudes of timesteps may be consistent across all levels of the trajectory tree 104 or may change as the distance from the root node increases. The timesteps of the trajectory tree 104 may align with an observation frequency (e.g., the frequency of data collection by one or more sensors), or may correspond to a different frequency. In some examples, the trajectory tree 104 represents timesteps that are longer than the time between observations, e.g., as a multiple of the time between observations or an unrelated magnitude.

The autonomous agent 104 may be configured to store data associated with trajectory planning (e.g., observation data 114, state data 116, and/or control data 118) in a data repository 112. A data repository 112 is any type of storage unit and/or device (e.g., a file system, database, collection of tables, or any other storage mechanism) for storing data. A data repository 112 may include multiple different storage units and/or devices. The multiple different storage units and/or devices may or may not be of the same type or located at the same physical site. Further, a data repository 112 may be implemented or may execute on the same computing system as one or more other components of the system 100. Alternatively or additionally, a data repository 112 may be implemented or executed on a computing system separate from one or more other components of the system 100. A data repository 112 may be logically integrated with one or more other components of the system 100. Alternatively or additionally, a data repository 112 may be communicatively coupled to one or more other components of the system 100 via a direct connection or via a network. In FIG. 1, a data repository 112 is illustrated as storing various kinds of information. Some or all of this information may be implemented and/or distributed across any of the components of the system 100. However, this information is illustrated within the data repository 112 for purposes of clarity and explanation.

One or more components of the system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

III. Operations for Latent Belief Space Planning Using a Trajectory Tree

Gaussian belief space planning assumes that all uncertainty can be represented in the form of unimodal Gaussian distributions over the state space. For example, a robot's position along an axis, in the presence of observational noise, may be modeled using a unimodal Gaussian distribution (a.k.a. "normal distribution"). As another example, the mass of a cargo container, in the absence of an ability to weigh the container precisely at a given moment, may be modeled using a unimodal Gaussian distribution. In contrast, techniques described herein capture the multi-modality of real-world uncertainty. Specifically, one or more embodiments represent multi-modal uncertainty using a trajectory tree, and apply differential dynamic programming (DDP) to optimize trajectory planning over the tree. As used herein, the terms "optimal," "optimize," "optimization," etc. do not refer to a theoretically optimal result, but rather to a best-effort attempt at optimization under real-world constraints (e.g., time, available computing power and/or memory, etc.).

In general, DDP techniques optimize a trajectory by alternating forward and backward passes. The forward pass rolls out the dynamics and costs using a control sequence. The backward pass takes a local second-order approximation to the value function and updates the control sequence to optimize the approximate value function. The forward and backward passes are repeated until a locally optimal trajectory is found.

PODDP plans in belief space, but unlike Gaussian belief space planning, the marginal distribution over observations is not unimodal and the belief-space trajectory cannot be approximated by propagating a single sequence of means and variances. In examples described herein (including, but not limited to, example scenarios of a "T-Maze" for planning under cost uncertainty, varying terrain roughness for planning under dynamic mode uncertainty, and lane changing for planning in a belief space that includes other agents' latent intensions), a discrete latent variable induces a multi-modal distribution over observations. In addition, a non-Gaussian belief state induces a theoretically infinitely branching tree of observations, beliefs, and controls. An initial PODDP forward pass constructs a trajectory tree from root to leaves, using one or more current observations (e.g., data from one or more sensors) as a basis for predicting possible outcomes over a finite time horizon. As used herein, "outcomes" refer to possible state transitions and "observations" refer to theoretical values of data received from sensors (i.e., theoretical observations that would be consistent with those state transitions). The trajectory tree represents a finite subset of the theoretically infinite branching tree of observations, beliefs, and controls, thus providing a finite structural approximation of a trajectory planning problem having theoretically infinite possible outcomes. An example of a trajectory tree is described in further detail below.

Figure 2A:
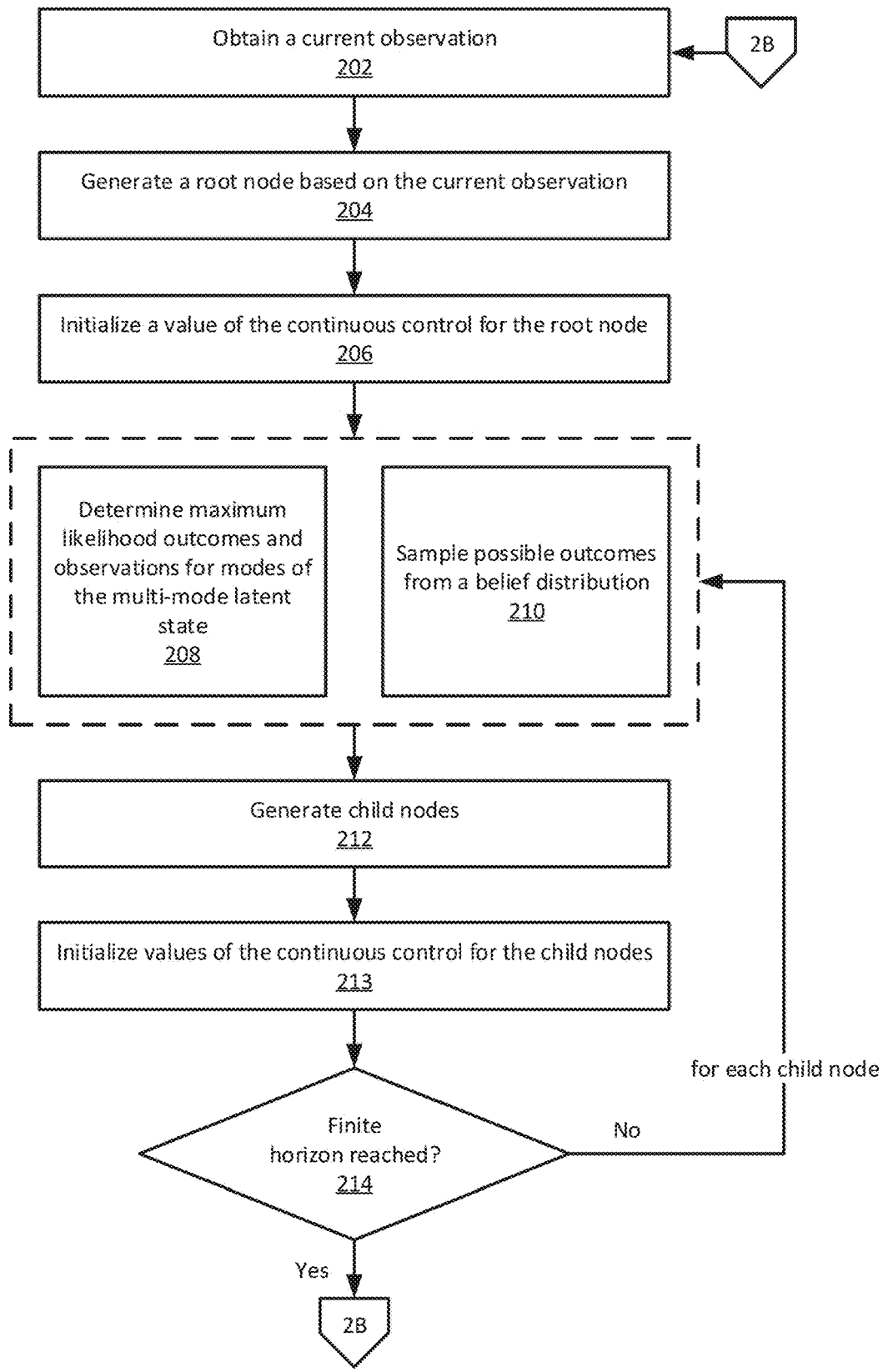
FIGS. 2A-2B are a flow diagram of an example of operations for latent belief space planning using a trajectory tree according to an embodiment.
Figure 2B:
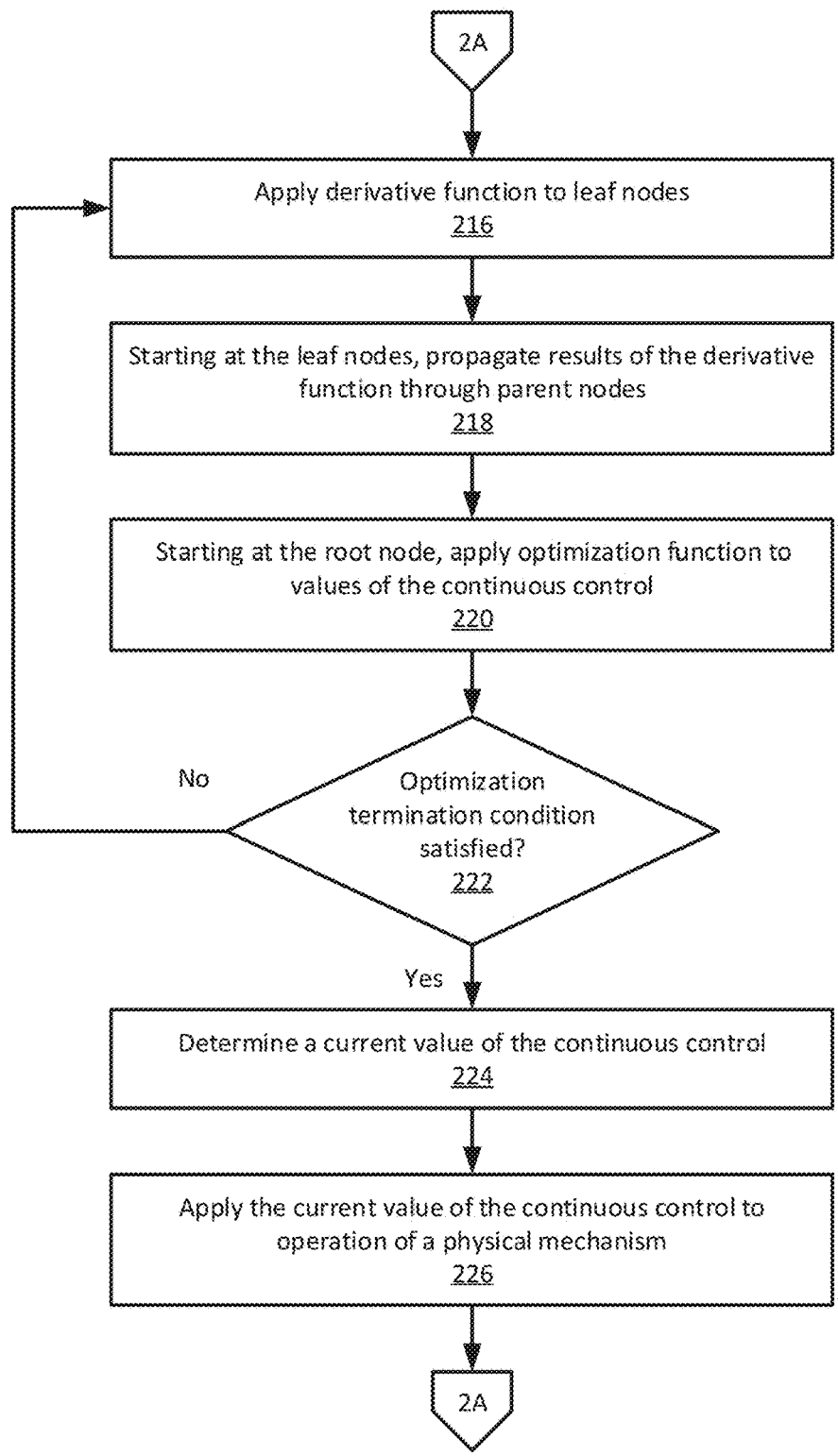
Figure 3:
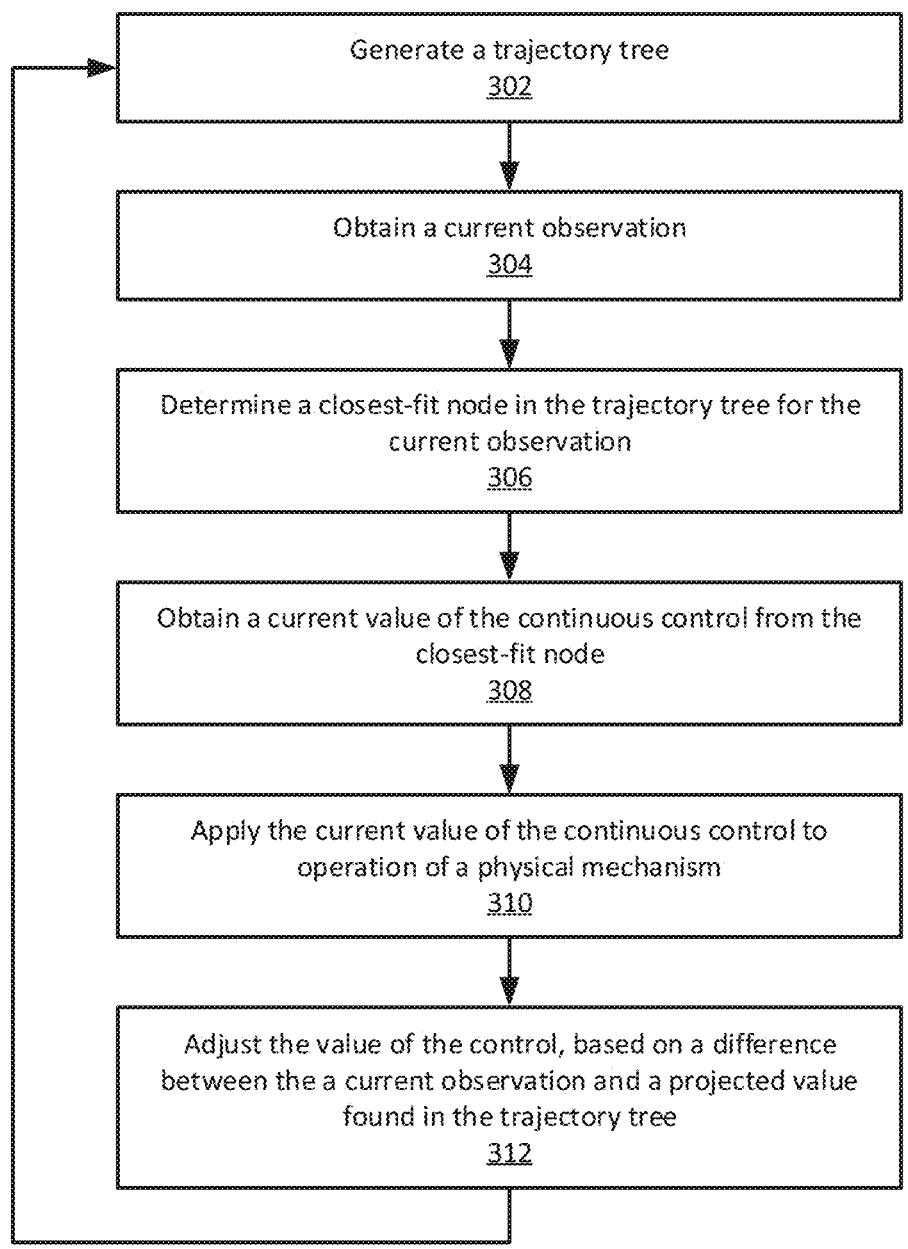
FIG. 3 is a flow diagram of another example of operations for latent belief space planning using a trajectory tree according to an embodiment.

The PODDP backward pass proceeds from the leaves of the tree and propagates the value through observations and belief updates via dynamic programming. A subsequent forward pass applies an optimization function to values of the continuous control at each node, based on the information propagated in the backward pass. As described below, multiple forward and backward passes may be used to iteratively optimize the trajectory tree. After optimization, the trajectory tree includes an optimized value of a control to apply to a physical mechanism for a control cycle. The following discussion of FIGS. 2A-2B and FIG. 3 provide a general overview of this process according to some embodiments. A detailed example is provided below with reference to FIGS. 4 and 5A-5B.

FIGS. 2A-2B are a flow diagram of an example of operations for latent belief space planning using a trajectory tree according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

Generating and optimizing a trajectory tree requires at least some information about the observable physical environment. An autonomous agent obtains a current observation (Operation 202), for example, from one or more sensors as illustrated in FIG. 1. The autonomous agent generates a root node based on the current observation (Operation 204) and initializes a value of the continuous control for the root node (Operation 206). The autonomous agent may initialize the continuous control as a default value (e.g., zero or some other default value, such as a default value based on prior experimentation). An initial forward pass of the trajectory tree may proceed from the root node to construct the trajectory tree, without yet making any attempt at optimizing the values of the continuous control at each node.

Generating child nodes is based on an understanding of the latent state as being multi-modal in structure. This understanding may be handled in various ways. In one approach, the autonomous agent determines maximum-likelihood outcomes and observations for modes of the multi-modal latent state (Operation 208). These maximum-likelihood outcomes and observations correspond to predicted peaks of the multi-modal latent state. An example of a maximum-likelihood outcomes (MLO) heuristic is described in further detail below, in which the maximum-likelihood outcomes and observations are computed as the means of the distributions. In another approach, the autonomous agent samples possible outcomes from a belief distribution (Operation 210), which may not correspond to predicted peaks of the multi-modal latent state. Whatever approach is used, the autonomous agent generates at least two child nodes of the root node (Operation 212), corresponding to respective outcomes and observations, and initializes values of the continuous control for each of the child nodes (Operation 213).

In an embodiment, generating the tree is a recursive process that continues to add levels to the trajectory tree until a predetermined finite horizon is reached. Specifically, the finite horizon may correspond to a predetermined number of timesteps (i.e., a predetermined number of levels of the trajectory tree), such that planning is based on projections up to a certain amount of time in the future. At each level of the initial forward pass, the autonomous agent determines whether the finite horizon has been reached (Decision 214). If the finite horizon has been reached, then the most recently-generated child nodes are left as leaf nodes. If the finite horizon has not been reached, then the process is repeated for each child node.

At the end of the first forward pass, the autonomous agent has generated a trajectory tree out to a finite horizon, with initial values of the continuous control for each node. Having thus constructed the trajectory tree, the autonomous agent may proceed to optimize the trajectory tree for a value of the continuous control at the root node. The optimization process may include at least one backward pass and one additional forward pass. In a backward pass, the autonomous agent applies a derivative function to the leaf nodes (Operation 216). Then, starting at the leaf nodes, the autonomous agent propagates results of the derivative function through the parent nodes, toward the root node (Operation 218). A subsequent forward pass starts again at the root node and utilizes the values of the derivative function propagated from the leaf nodes. Specifically, starting at the root node and proceeding toward the leaf nodes, the autonomous agent applies an optimization function to values of the continuous control (Operation 220).

The autonomous agent may iteratively perform one or more additional forward and/or backward passes of the trajectory tree, until one or more optimization termination conditions is/are satisfied (Decision 222). The autonomous agent may use many different criteria to determine when to stop optimizing the trajectory tree. For example, the autonomous agent may have a limited amount of time in which to generate the trajectory tree (e.g., an amount of time that allows the autonomous agent to satisfy a target control frequency). An optimization termination condition may be satisfied when that amount of time is reached, or is expected to be reached before completing another forward and/or backward pass. The autonomous agent may check how much time remains at the end of a forward or backward pass, and/or at intervals throughout each forward or backward pass (e.g., at each level of traversal and/or at each node). Alternatively or additionally, the autonomous agent may compare the value of the continuous control (i.e., at the root node and/or one or more other nodes) from one iteration to the next. An optimization termination condition may be satisfied when the current value of the continuous control differs from a prior value (for example, from the value at the root node in a previous pass of the trajectory tree) by no more than a predetermined threshold difference (e.g., as a percentage or absolute value), implying that additional iterations will provide such marginal improvement that they are not required.

When the autonomous agent has finished optimizing the trajectory tree, the autonomous agent determines a current value of the continuous control (Operation 224). Specifically, the value of the continuous control at the root node represents the optimized value based on the most current observation and optimizations, as described above. This value thus represents the optimal value to apply in the current control cycle. Accordingly, the autonomous agent applies the current value of the continuous control to operation of the physical mechanism being controlled by the autonomous agent (Operation 226).

The autonomous agent may repeat the process described above on an ongoing basis, during operation of the autonomous vehicle. Specifically, the autonomous agent may continue to obtain new observations (e.g., according to a control frequency and/or observation frequency), and generate trajectory trees, to determine the optimal control to apply on an ongoing basis. Upon obtaining a new observation, the autonomous agent may generate a new trajectory tree from scratch (i.e., initialize a new trajectory tree data structure with default control values and then optimize the new trajectory tree) or reuse an existing trajectory tree data structure. When reusing an existing data structure, the autonomous agent may re-initialize controls to default values at each node. Alternatively, the autonomous agent may use values already present in the trajectory tree as initial control values. The autonomous agent may copy the existing values to a new data structure or reuse the same data structure. In addition, given that the new trajectory tree starts at least one timestep forward in time, the autonomous agent may discard the unused branch(es) (i.e., any projected trajectories that are no longer relevant) and extend the depth of the remaining subtree by adding one or more layers of child nodes, to account for the passage of time and keep the finite horizon constant. Reusing existing values and/or the data structure may help reduce the amount of processing needed to optimize the trajectory tree for the next control cycle.

In the example of FIGS. 2A-2B, for each control cycle, the autonomous agent uses the trajectory tree to optimize for a value of the continuous control based on a current observation. In another approach, the autonomous agent still initializes and optimizes the trajectory tree (i.e., over a series of forward and backward passes, until an optimization termination criterion is satisfied). However, in this approach, the autonomous agent does not re-optimize the trajectory tree for each control cycle. Instead, for a given control cycle, the autonomous agent determines which node of the previously-generated trajectory tree most closely approximates real-world conditions, i.e., the node whose observation value most closely matches a current, real-world observation. Between control cycles, the autonomous agent may adjust the value of the control to be applied, based on differences between real-world observations and the approximations found in the tree. For example, as described in further detail below, the autonomous agent may apply a linear feedback gain (i.e., increase or decrease the value(s) of one or more dimensions of the nominal control) based on a difference between real-world and projected observations. FIG. 3 is a flow diagram of another example of operations for latent belief space planning using a trajectory tree according to an embodiment, following this alternative approach. One or more operations illustrated in FIG. 3 may be modified, rearranged, or omitted all together. Accordingly, the particular sequence of operations illustrated in FIG. 3 should not be construed as limiting the scope of one or more embodiments.

In this approach, an autonomous agent generates a trajectory tree based on information about the observable physical environment (Operation 302), for example using techniques described above with respect to FIGS. 2A-2B. At a later time (e.g., after an amount of time corresponding to one or more timesteps in the trajectory tree), the autonomous agent obtains a current observation (Operation 304) that includes information about the observable physical environment at that time. As noted above, the nodes of the trajectory tree represent a branching set of possible controls and observations. To determine which control to apply in the current control cycle, the autonomous agent may determine a closest-fit node in the trajectory tree, for the current observation (Operation 306). That is, the autonomous agent may determine which node includes a value of the continuous observation that most closely matches (e.g., as a percentage or absolute difference) the current observation. The autonomous agent may inspect the entire trajectory tree or may inspect only the nodes at a given level, i.e., the level associated with the current timestep. Upon determining which node is the closest-fit node, the autonomous agent obtains the current value of the continuous control from the closest-fit node (Operation 308) and applies the current value of the continuous control to operation of the physical mechanism being controlled by the autonomous agent (Operation 310).

Because the possible value of the continuous observation at the closest-fit node likely does not match the current observation exactly, the autonomous agent may adjust the value of the control to be applied, based on a difference between one or more current, real-world observations and the projected value(s) found in the tree (Operation 312). Formula (9) below includes a linear closed-loop feedback gain "K." The adjusted value of a control $u_{adj}$ may be a function of (1) the nominal control $u_{nom}$, (2) $K_{branch}$ for the branch of the trajectory tree starting from the closest-fit node, (3) the nominal belief state, and (4) the actual belief state. For example:

$$u_{adj}=u_{nom}+K_{branch}\times(\langle x_{nom},b_{nom}\rangle-\langle x_{actual},b_{actual}\rangle) \quad (1)$$

Alternatively or additionally, another formula may be used to compute and apply a feedback gain and/or other kind of adjustment. In addition, the autonomous agent may add child nodes to the branch of the trajectory tree that emanates from the closest-fit node. Alternatively, the autonomous agent may regenerate the trajectory tree periodically, based on current observations, using techniques described above with respect to FIGS. 2A-2B. For example, the autonomous agent may regenerate the trajectory tree when the finite horizon is reached, indicating that the trajectory tree no longer supplies a plan to execute for the next control cycle. Alternatively, the autonomous agent may regenerate the trajectory tree every N control cycles, where N is a predetermined number of control cycles and may be configurable, thus using a hybrid approach that reduces the number of times the trajectory tree must be regenerated.

The autonomous agent may repeat the process described above on an ongoing basis, during operation of the autonomous vehicle. Specifically, the autonomous agent may continue to obtain new observations (e.g., according to a control frequency and/or observation frequency), and match the new observations to closest-fit nodes in the trajectory tree (optionally regenerating the trajectory tree periodically, as described above), to determine the optimal control to apply on an ongoing basis.

IV. Detailed Examples

Detailed examples are described below for purposes of clarity. Components and/or operations described below should be understood as examples that may not be applicable to one or more embodiments. Accordingly, components and/or operations described below should not be construed as limiting the scope of one or more embodiments.

A. Trajectory Tree Optimization

1. Problem Formulation

The following examples consider finite-horizon trajectory planning and control problems, in environments with hybrid continuous and discrete state, and continuous actions and observations. The state space (referring generally to a combination of hidden and continuous states) may be represented as $S=X\times Z$ and factorized into a continuous state space X and a discrete space state Z. The discrete state represents the latent mode of the hybrid system. The control space U and observation space O are continuous. For simplicity, the continuous state may be assumed to be fully observable, while the discrete state is partially observable; this formulation is thus a mixed-observability Markov decision process (MDP) model that yields more compact representations of the belief space and dynamics. However, the model may be extended to allow partially observable continuous state, for example by assuming the continuous state to be Gaussian distributed and planning in the Gaussian belief state. In addition, for simplicity, the value of the hidden state may be assumed to be constant over the planning horizon. This assumption is sensible when dealing with problems with relatively short planning horizons (e.g., model-predictive control) over which the hidden state can be assumed to be constant. However, other embodiments may extend stochastic dynamics over the hidden state, for example by incorporating Bayesian filtering to update the belief over the hidden state.

In these examples, system dynamics are defined by the conditional distribution over the next state $x_{t+1}, p(x_{t+1}|x_t, u_t, z)$, which depends on the current state $\langle x_t, z\rangle \in S$, and control $u_t \in U$. The observation distribution $p(o_t|x_t, z)$ is also conditioned on the current state. The current belief about the hidden state depends on the history of observed states, controls, and observations. Recursive Bayesian filtering may be used to update the current belief, based on the latest observation, which includes both $o_t$ and $x_t$, following the mixed-observability assumption:

$$b_{t+1}(z) = P(z \mid o_t, x_t, u_{t-1}, \cdots, o_1, x_1, u_0, x_o, b_0) \quad (2)$$
$$= P(z \mid o_t, x_t, u_{t-1}, x_{t-1}, b_t)$$
$$= \eta \cdot p(o_t \mid x_t, z) p(x_t \mid x_{t-1}, u_{t-1}, z) b_t(z)$$
$$= h(o_t, x_t, u_{t-1}, x_{t-1}, b_t),$$

where $\eta$ is a normalizing constant, and where h( ) is defined to denote the deterministic belief update function mapping $b_t$ to $b_{t+1}$.

The running loss function $l(x_t, u_t, z)$ represents the loss incurred by the control $u_t$ from the current state, and the final loss function $l_f(x_T, z)$ represents the loss incurred within a state at the end of the planning horizon; both functions may be assumed to be twice-differentiable. To reduce costs, controls may be conditioned on the current belief state, defined as the pair $\langle x_t, b_t \rangle$ because the current POMDP state $\langle x_t, z \rangle$ is not fully observable. The expected finite-horizon cost of a policy $\pi$ may be defined mapping belief states to controls recursively:

$$V^\pi(x_t, b_t) = \mathbb{E}_{z \sim b_t}[l(x_t, \pi(x_t, b_t), z)] + \mathbb{E}_{o_t, x_{t+1}}[V^\pi(x_{t+1}, h(o_t, x_t, u_{t-1}, x_{t-1}, b_t))]] \quad (3)$$

$$V^\pi(x_t, b_T) = \mathbb{E}_{z \sim b_T}[l_f(x_T, z)]$$

where in the second expectation $o_t \sim p(o_t \mid x_t, z)$ and $x_{t+1} \sim p(x_{t+1} \mid x_t, u_t, z)$ and where the value at the planning horizon T is the expected final cost. In this example, the optimal policy may thus be defined as:

$$\pi^*(x, b) = \arg\max_\pi V^\pi(x, b). \quad (4)$$

An example of a PODDP approach to computing V and $\pi^*$ is described below.

2. PODDP Forward Pass

Partially observable differential dynamic programming (PODDP) is discussed generally above. In this example, given an initial belief state $\langle x_0, b_0 \rangle$, the initial PODDP forward pass constructs a trajectory tree that approximates the infinite space of possible control, state, observation, and belief sequences up to a finite horizon T. Each node in the tree may be labeled with the control to be executed if that node is (theoretically) reached. Given the control and belief state at a given node, a finite set of branches from that node may be generated, corresponding to possible state transitions, observations, and belief updates. A control node is created following each branch, and tree expansion proceeds recursively until the finite horizon is reached.

Figure 4:
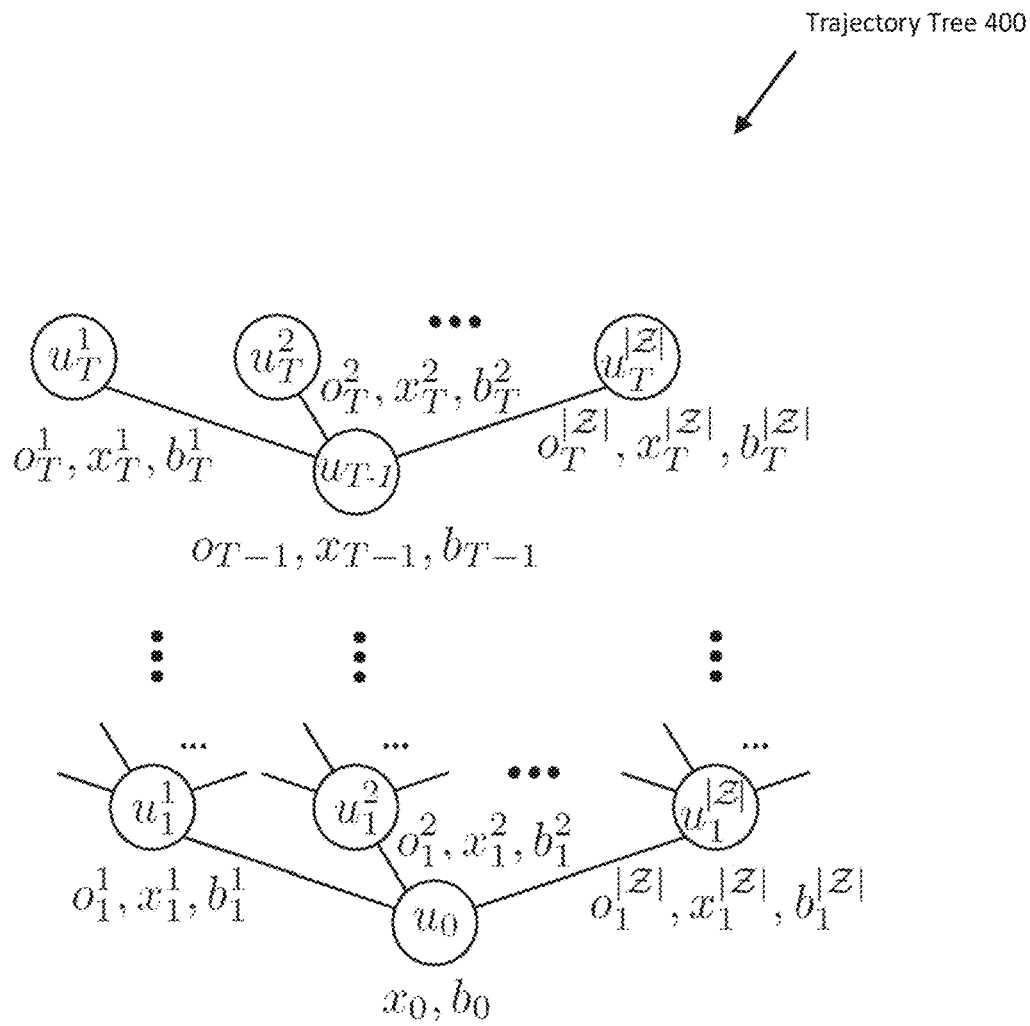
FIG. 4 illustrates an example of a trajectory tree according to an embodiment.

FIG. 4 illustrates an example of a trajectory tree 400 according to an embodiment, and FIG. 5A illustrates an example of an algorithm 502 for a forward pass according to an embodiment. As illustrated in FIG. 4, starting from belief state $\langle x_0, b_0 \rangle$, tree construction rolls out control $u_0$ for each possible latent state value $z \in Z$, assuming next state $x_1^z$ and observation $o_1^z$ take their maximum likelihood value, and $b_1^z$ is given by Bayesian belief updating. Tree construction proceeds recursively from each $x_1^z$, $b_1^z$, until the finite horizon is reached. In the example illustrated in FIG. 4, superscript labels for $o_{T-1}$, $x_{T-1}$, $b_{T-1}$ have been suppressed for clarity. A complete notation would record the complete history of latent state values used to generate the state and observation sequence preceding the node.

To approximate the infinite set of continuous observations that are possible from each node, a maximum-likelihood outcomes (MLO) heuristic may be used. For each possible latent state value $z \in Z$, the maximum-likelihood state transition and observation are computed, and a belief update is performed as illustrated in lines 12-14 of the algorithm 502. The MLO heuristic transforms the operation of sampling next states and observations into a deterministic function, which PODDP requires to be differentiable. Accordingly, $p(x_t \mid x_{t-1}, u_{t-1}, z)$ and $p(o_t \mid x_t, z)$ may be assumed to be Gaussian distributions with additive noise. In this approach, MLO corresponds to taking the mean of the distributions, and differentiation includes taking the derivative of the underlying process.

In this example, the forward pass is called on every iteration of PODDP. On the first iteration, the nominal controls $U_{nom}$ are initialized to a default value (constant in the examples herein, although more complex schemes are possible), and nominal belief states $S_{nom}$ and the control updates k and K are set to null. At later iterations, k and K, computed by the backward pass, specify modifications to the previous control $U_{nom}$ and provide linear feedback control gains to stabilize the trajectory around $S_{nom}$, respectively. The step size a is set by a line search procedure.

3. PODDP Backward Pass

Continuing the example, DDP computes a second-order approximation to the value function within a local region around a trajectory, i.e., within a theoretical geometric region that encompasses small perturbations around the trajectory and for which the second-order approximation remains valid. Starting from the end of the trajectory (i.e., a leaf node), DDP takes second-order approximations to the cost function and the dynamics, and uses dynamic programming to propagate the value function backward through time. In this discussion, the "value function" computes the expected sum of costs up to the finite horizon, corresponding to the "value" of the trajectory. The "cost function" is a function of the state and the control that returns a scalar, indicating how undesirable or costly that control is in that state. For example, a cost function may represent how much effort or energy a given control requires. "Dynamics" refers to how the system changes over time as a function of its current state and its controls, e.g., x'=f(x,u). The general concept of dynamic programming is discussed in Dimitri P. Bertsekas, Dynamic Programming and Optimal Control (2017). During this process, locally optimal control modifications and linear feedback control gains are computed, which are used to update the trajectory during the next forward pass.

The PODDP backward pass operates over a trajectory tree, proceeding from the leaves and propagating the values through the observation and belief updates that take place at each node. FIG. 5B illustrates an example of an algorithm 504 for a backward pass according to an embodiment. The algorithm 504 traverses the trajectory tree in depth-first order, and propagates the necessary derivatives backward through the tree recursively. The algorithm 504 includes performing the second-order approximation to the value function and returning the derivates and control updates to be propagated backward through the trajectory tree.

Dynamic programming over the trajectory tree requires differentiation through the belief space dynamics at each observation and belief update. However, differentiating the raw belief state is problematic, because perturbations can push the belief off the $|Z|-1$-dimensional simplex. To resolve this issue, the belief state may be re-parameterized in terms of the unconstrained parameter $\beta \in \mathbb{R}^{|Z|}$, such that:

$$b(z; \beta) = \frac{\exp(\beta(z))}{\sum_{z' \in Z} \exp(\beta(z'))} \quad (5)$$

and the belief space takes the form $S = X \times \mathbb{R}^{|Z|}$. The re-parameterized belief update naturally derives from the algorithm 502, of FIG. 5A, such that $\beta_{t+1}(z) = \log(b_{t+1}(z))$.

To complete the derivation of the backward pass for PODDP, the state-action value function may be defined to operate over perturbations of s and u:

$$Q(\delta s, \delta u) = \quad (6)$$
$$\sum_{z \in Z} b(z; \beta + \delta\beta)[l(x + \delta x, u + \delta u, z) + V(x + \delta x, h(o', x', u + \delta u,$$
$$x + \delta x, b(\beta + \delta\beta)))] = \sum_{z \in Z} b_z(l_z + V(s'_z))$$

where $\delta s$ is implicitly decomposed into $\delta x$ and $\delta\beta$, and where o' and x' are assumed to take on their maximum-likelihood values. The second expression introduces variable abbreviations that are used in the continuing discussion below. In addition, let $V'_z = (s'_z)$.

A second-order approximation $\tilde{Q}$ may be taken to the state-action value function by computing first- and second-derivatives with respect to $\delta s$ and $\delta u$. In this example, an iterative Linear Quadratic Regulator (iLQR) approach is used to discard the Hessians of the dynamics.

$$Q_s = \sum_{z \in Z} \left[ \frac{\partial b_z}{\partial \delta s}(l_z + V'_z) + b_z \left( \frac{\partial l_s}{\partial \delta s} + \frac{\partial s'_z}{\partial \delta s}^T \frac{\partial V'_z}{\partial s'_z} \right) \right] \quad (7)$$

$$Q_u = \sum_{z \in Z} \left[ b_z \left( \frac{\partial l_z}{\partial \delta u} + \frac{\partial s'_z}{\partial \delta u}^T \frac{\partial V'_z}{\partial s'_z} \right) \right] \quad (8)$$

Although this approach differentiates the raw belief $b_z$, the re-parameterization described above makes these derivatives well-behaved near the simplex boundary, where the derivatives take on small values for extremal beliefs, and small perturbations $\delta s$ do not violate the simplex constraint. The $$\frac{\partial s'_z}{\partial \delta s} \text{ and } \frac{\partial s'_z}{\partial \delta u}$$

terms involve differentiating through the dynamics, observation model, and belief update. The $\partial V'_z/\partial s'_z$ and $\partial V'_z/\partial s'_z$ terms are the backward derivatives propagated within the A argument in algorithm 504 of FIG. 5B.

In this example, the optimal control modification $\delta u^*$ for belief state perturbation $\delta s$ is computed by minimizing the quadratic model $\tilde{Q}$:

$$\delta u^*(\delta s) = \arg\min_u \tilde{Q}(\delta s, \delta u) = k + K\delta s, \quad (9)$$

where $k = -Q_{uu}^{-1} Q_u$ is an open-loop modification to be applied in the forward pass, and $K = Q_{uu}^{-1} Q_{us}$ is a linear closed-loop feedback gain.

4. Hierarchical PODDP

Because each node in the trajectory tree has $|Z|$ successor nodes, the tree has size $(|Z|^T - 1)/(|Z| - 1) = O(|Z|^T)$. This exponential growth is manageable for short horizons (e.g., T<5), but may be infeasible for longer horizons (e.g., such as those required for some robotics tasks). However, branching on every timestep may be unnecessary for several reasons. First, many robotics systems have high control frequency, but much lower state estimation frequency, particularly for sensor fusion from multiple modalities (e.g., cameras, lidar, etc.). In such cases, observation timesteps in the planner may be aligned with times when observations are expected to occur in the system. Second, planning with a lower observation frequency than that of the actual system may yield trajectories that take observation contingencies into account but are more conservative than those that observe at every timestep.

In this example, to derive a hierarchical PODDP algorithm, the derivation above may be followed, but with the trajectory partitioned into a set of k segments indexed by $\tau_0 = 0, \tau_1, \ldots, \tau_k = T$. The value of the belief state at the beginning of a segment may be defined similar to equation (3) above, but accumulating the cost over $\tau_{i+1} - \tau_i$ steps, and taking the expected value of the belief state at the end of $\tau_{i+1} - \tau_i$ steps:

$$V^\pi(x_{\tau_i}, b_{\tau_i}) = \quad (10)$$
$$\mathbb{E}_{z \sim b_t} \left[ \sum_{t=\tau_i}^{\tau_{i+1}-1} l(x_t, u_t, z) + \mathbb{E}_{o_{\tau_{i+1}-1}, x_{\tau_{i+1}}} [V^\pi(x_{\tau_{i+1}}, b_{\tau_{i+1}})] \right]$$

The second-order expansion may be taken similar to the description above, but with respect to perturbations of each segment. Hierarchical dynamic programming may be further optimized by applying DDP recursions to each step of a segment. The scenarios described below use hierarchical PODDP with k=3.

B. Scenarios

Figure 6A:
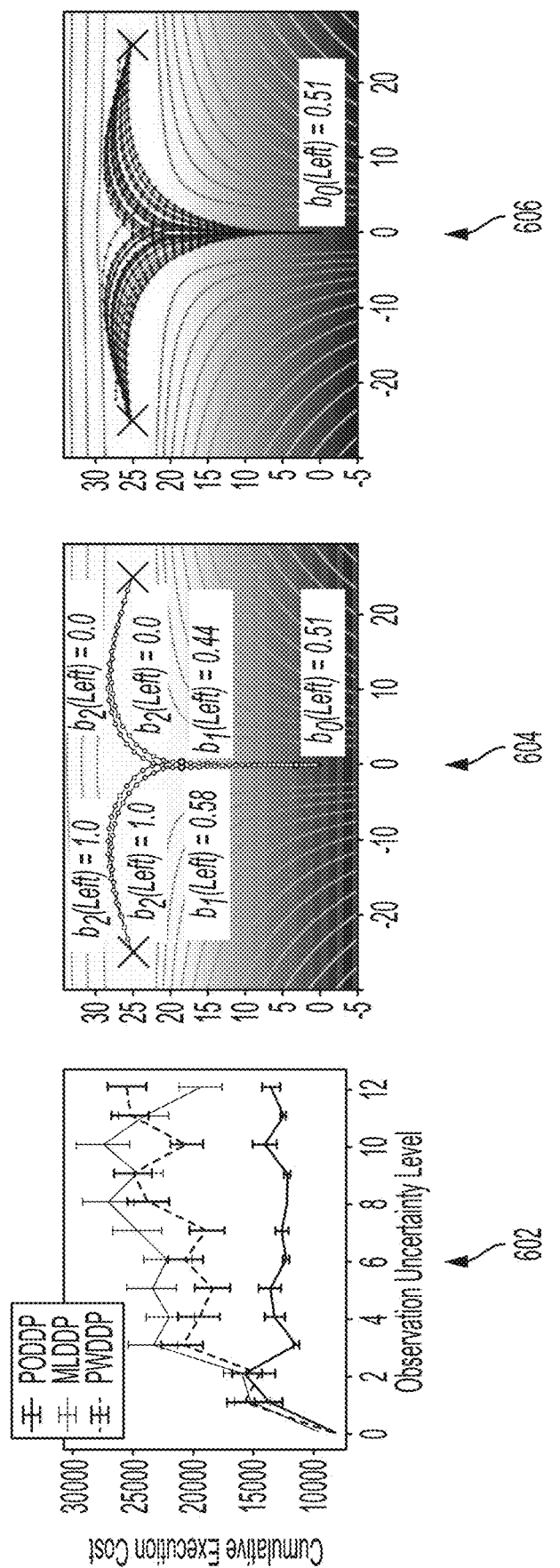
FIGS. 6A-6C illustrate examples of latent belief space planning scenarios according to an embodiment.
Figure 6B:
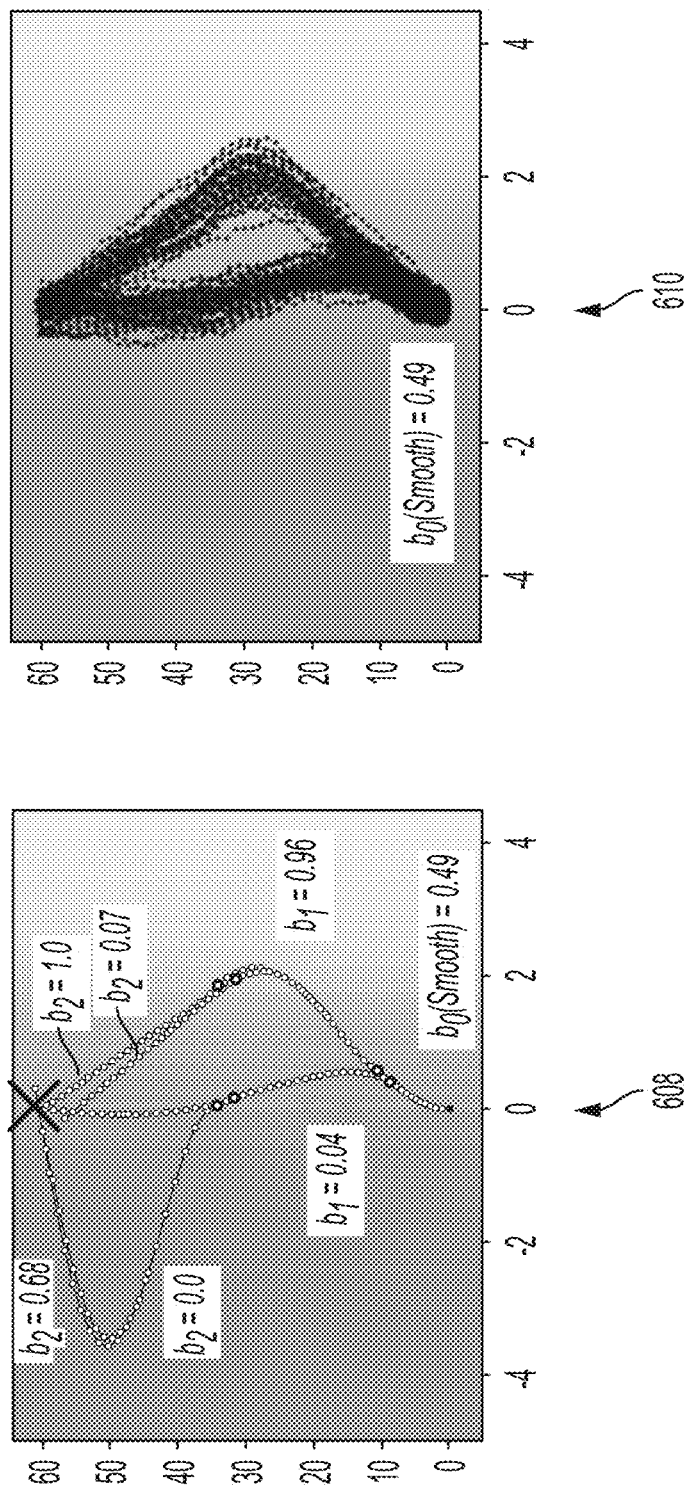
Figure 6C:
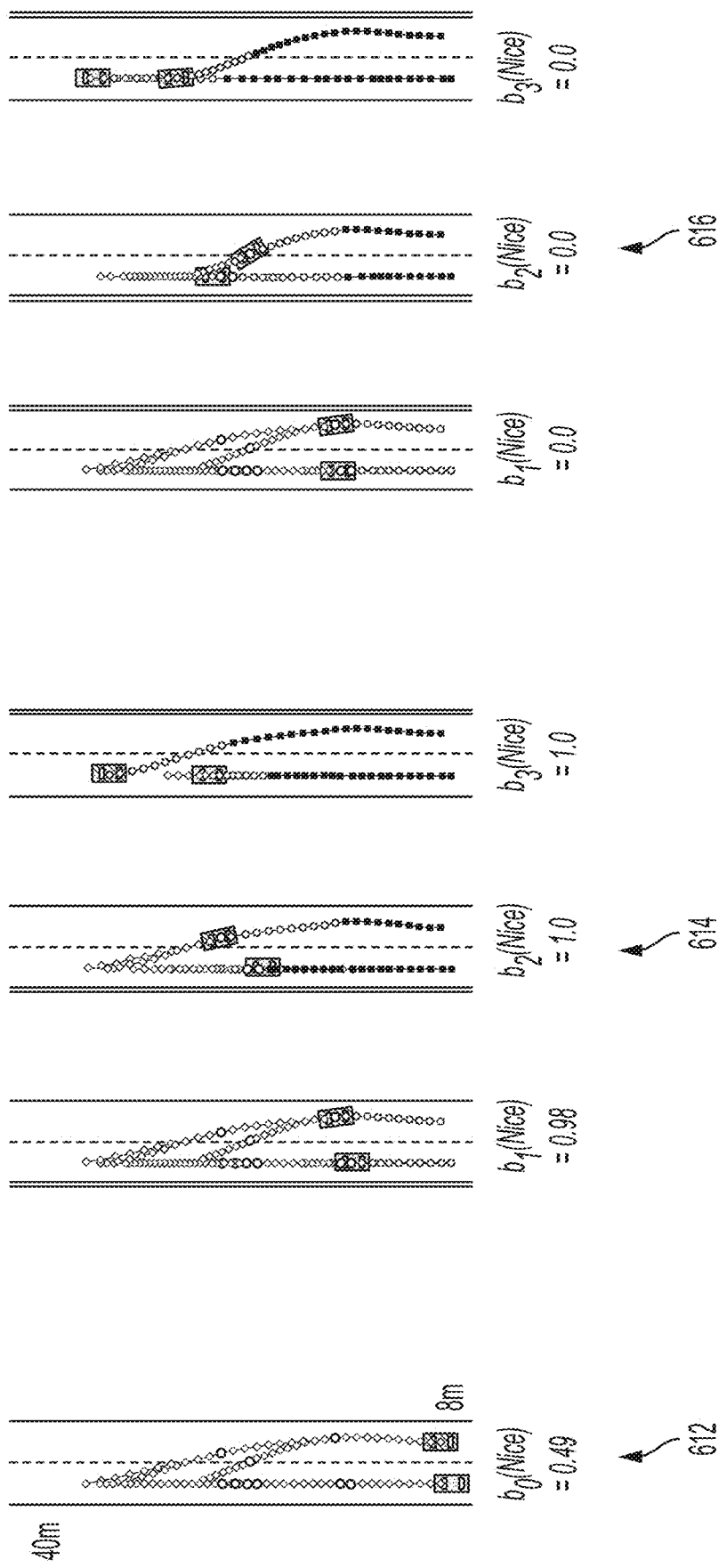

As noted above, PODDPs provide a trajectory optimization approach for solving nonlinear POMDPs involving continuous states, actions, and observations, with non-Gaussian beliefs over discrete latent variables. FIGS. 6A-6C illustrate examples of latent belief space planning scenarios according to an embodiment. These examples are based on experiments in which PODDP was compared against two baselines. The first baseline, "maximum-likelihood DDP" (MLDDP), assumes the latent state with the highest probability is the true latent state, and runs standard DDP. At each observation point, MLDDP re-plans based on the updated most-likely belief. The second baseline, "Probability-weighted DDP" (PWDDP), minimizes the expected cost of a control sequence with respect to the current belief, using a version of equation (9), with k=1 and $\tau_k$ equal to the horizon length.

1. Planning Under Cost Uncertainty

In the scenario illustrated in FIG. 6A, the location of a goal is unknown, and determined by the latent world state. The environment is structured as a "T-Maze": a long corridor that is surrounded by high-cost regions and splits left and right at the end. A binary latent state determines whether the goal is on the Left or Right. Goal costs that increase quadratically with the distance from the true goal location induce the agent to move to the goal as quickly as possible. Diagram 604 of FIG. 6A illustrates this environment, with a contour plot of the location cost overlaid, and goal locations marked with X's. The agent is a simulated vehicle with non-holonomic bicycle dynamics. The observation function generates a Gaussian random variable conditioned on the latent state z: the mean is −1 if z=Left and 1 if z=Right. The uncertainty of the observation decreases as the vehicle moves to the end of the maze. This uncertainty is parameterized by a smooth function that outputs the variance of the distributions, illustrated by the background gradient of diagram 604.

Diagram 602 of FIG. 6A compares the average cumulative cost incurred by PODDP versus the two baseline models, over 100 sampled executions in each of thirteen environments, each with a different level of observation uncertainty. PODDP outperformed both baselines and exhibited lower variance.

Diagram 604 of FIG. 6A illustrates a trajectory tree optimized by PODDP, starting from the belief b(z=Left)=0.51. The tree includes a contingency plan for all possible maximum-likelihood outcome sequences, conditioned on the latent state values. Diagram 606 of FIG. 6A illustrates the 100 executed trajectories used in diagram 602 for uncertainty level=9.1, sampling observations and state transitions from their true distributions. Among the executed trajectories are some in which the agent first moved to one side, then crossed back to seek the goal on the other side. These correspond to "bad" observations, which indicate the incorrect latent state. Diagram 604 illustrates that PODDP plans for such contingencies, and Diagram 606 illustrates that it handles them gracefully, by responding conservatively to noisy observations so that recovery is possible following later, better observations.

Table 1, below, shows the results of a targeted analysis on the mean cumulative cost incurred by each model over 1000 executions for observation uncertainty level=9.1. PODDP incurred significantly less mean cumulative cost than MLDDP (t(1998)=15.1, p<0.00001), and PODDP also incurred significantly less mean cumulative cost than PWDDP (t(1998)=18.9, p<0.00001). The mean cumulative costs incurred by MLDDP and PWDDP were not significantly different (t(1998)=0.01, p=0.96).

TABLE 1

Mean cumulative cost (standard error in parentheses) incurred by each model in Experiment 1 over 1000 samples.

| PODDP | MLDDP | PWDDP |
| --- | --- | --- |
| 13330.6 (244.5) | 23839.8 (649.1) | 23878.5 (500.7) |

2. Planning Under Dynamic Mode Uncertainty

The scenario illustrated in FIG. 6B is based on an experiment designed to test whether PODDP can plan in the belief space over uncertain, partially observable dynamical modes of the environment. In this scenario, as illustrated in diagram 608 of FIG. 6B, a simulated vehicle with non-holonomic bicycle dynamics was moving toward a goal (marked by an X) over rough terrain (e.g., "mud"), which exerts a resistive force while the vehicle is moving. The terrain thus imposes cost due to the additional force required to maintain a constant velocity. A binary latent state determines the smoothness of the terrain to the right of the vehicle: when the latent state z=Smooth, the terrain to the right exerts low resistive force; when z=Rough, the terrain to the right is rough, with high resistive force equal to that on the left. Diagram 608 illustrates the gradient from rough to smooth terrain, going from left to right when the latent state is Smooth.

In this example, the only source of information about the latent state comes from observing the dynamics themselves via the state sequence. This presents a challenging planning problem: exploring the environment to infer the value of z requires a costly detour right into the potentially smooth area, but the payoff is large if the agent can learn that the terrain is smooth and reduce the cost thereafter.

Diagram 608 illustrates that PODDP plans an exploratory policy to learn the value of z. The planned trajectory, starting from the belief b(z=Smooth)=0.49, immediately moves to the right to gain information about z. The first observation yields strong information about z, and the beliefs become near-certain, which the conditional plan can then exploit—either by veering into the smooth area or by heading directly through the mud to the goal location. Diagram 610 of FIG. 6B illustrates 100 sampled executions through the rough terrain environment, demonstrating the robustness of the planned PODDP trajectory tree.

Table 2, below, reports the mean cumulative cost over 1000 executions for each model. PODDP incurred significantly lower mean cumulative cost than both MLDDP, (t(1998)=3.9, p=0.00008) and PWDDP (t(1998)=2.7, p=0.007). The mean cumulative costs incurred by MLDDP and PWDDP were not significantly different (t(1998)=0.41, p=0.68).

TABLE 2

Mean cumulative cost (standard error in parentheses) incurred by each model in Experiment 2 over 1000 samples.

| PODDP | MLDDP | PWDDP |
| --- | --- | --- |
| 22110.7 (124.4) | 22710.7 (87.3) | 22639.5 (151.9) |

3. Latent Intention-Aware Interactive Lane Changing

The scenario illustrated in FIG. 6C is based on an experiment designed to test the ability of PODDP to plan trajectories through a belief state that includes the latent intentions of other agents, and dynamics that capture agents' intention-dependent actions. This scenario includes another vehicle in the state space, parameterized by a longitude and velocity (the planner vehicle again has bicycle dynamics). The other vehicle dynamics are modeled using a modified Intelligent Driver Model (IDM), with a smooth boundary function for identifying the leading vehicle. The latent state represents whether the other driver is Nice or Aggressive. If the other driver is Nice, it is assumed to have a lower desired speed and to slow down for others. If the other driver is Aggressive, it is assumed to have a higher desired speed and to not slow down for others.

FIG. 6C illustrates that PODDP can plan in the belief space of the other vehicle's latent state; it can construct a contingency plan to change lanes ahead of the other vehicle if the other vehicle is inferred to be Nice, or change lanes behind the other vehicle if the other vehicle is inferred to be Aggressive. Diagrams 614 and 616 of FIG. 6C illustrate the successful execution of these plans. PWDDP also succeeded at changing lanes ahead of the Nice driver and changing lanes behind the Aggressive driver. However, as shown in Table 3 below, over 1000 sample executions, PWDDP incurred significantly higher cost than both PODDP (t(1998)=14.8, p<0.00001) and MLDDP (t(1998)=8.3, p<0.00001). In contrast, MLDDP failed to pass the Nice driver and always changed lanes behind both the Nice and Aggressive drivers, while incurring significantly higher cost than PODDP (t(1998)=5.3, p<0.00001). This result was attributable to the maximum likelihood initial belief being Aggressive, leading MLDDP to immediately decelerate and lose the chance to pass. By way of comparison, 1000 additional sample executions were run with $b_0$(Nice)=0.51. With this prior, MLDDP succeeded at passing the Nice driver and changing lanes behind the Aggressive driver, but incurred a higher mean cumulative cost, as shown in Table 3. Running PODDP and PWDDP in this modified condition, the mean cumulative costs were not significantly different than with the other prior.

TABLE 3

Mean cumulative cost (standard error in parentheses) incurred by each model in Experiment 3 over 1000 samples.

| PODDP | MLDDP | PWDDP | MLDDP ($b_0$(Nice) = 0.51) |
|---|---|---|---|
| 121.3 (0.46) | 130.3 (1.6) | 152.1 (2.0) | 143.2 (2.0) |

As the examples above demonstrate, PODDP is capable of planning trajectories in a wide range of scenarios, with high success and low cost when compared with other approaches.

V. Miscellaneous; Extensions

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

VI. Computer Systems

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 7:
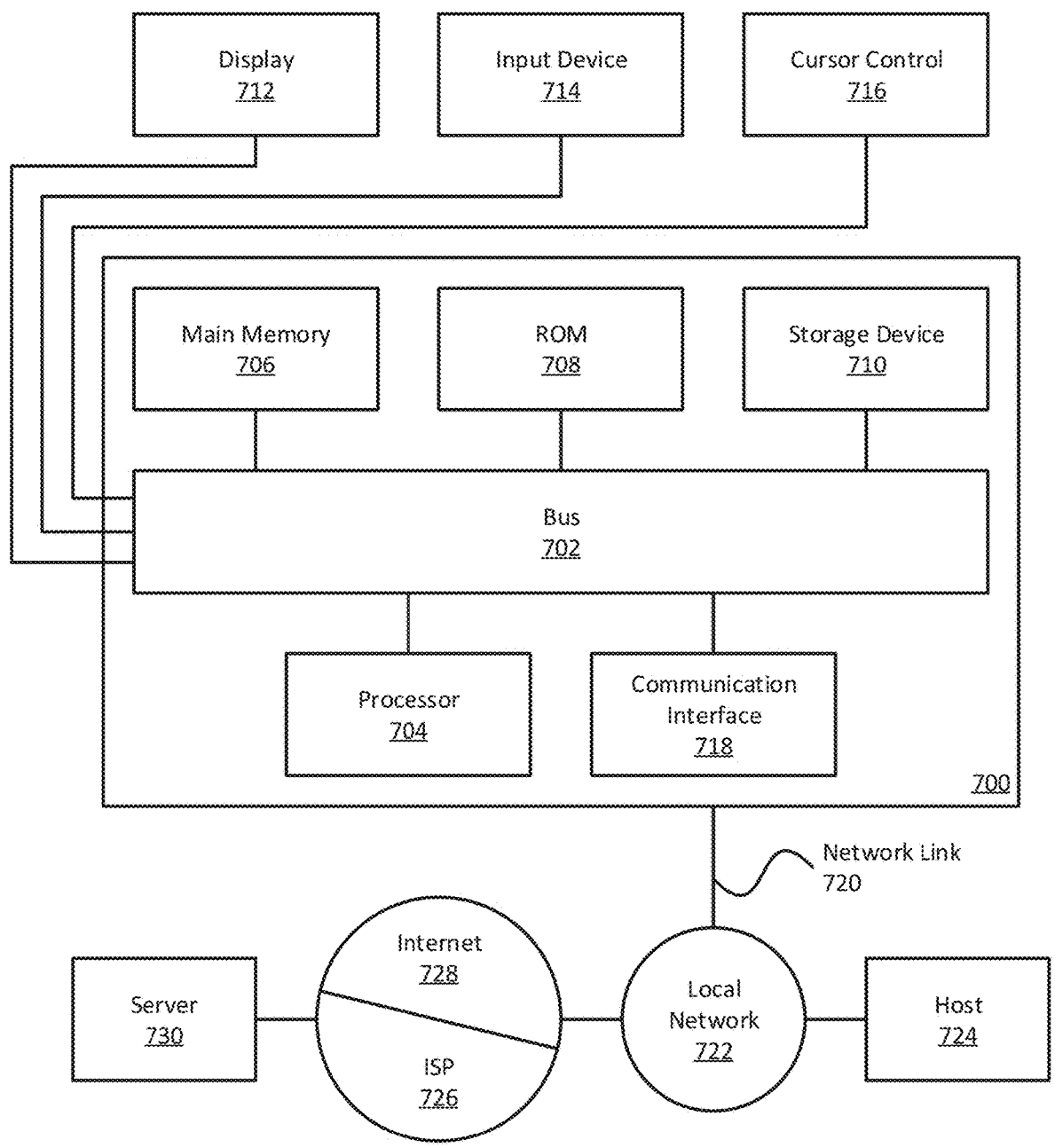
FIG. 7 is a block diagram of an example of a computer system according to an embodiment.

For example, FIG. 7 is a block diagram of an example of a computer system 700 according to an embodiment. Computer system 700 includes a bus 702 or other communication mechanism for communicating information, and a hardware processor 704 coupled with the bus 702 for processing information. Hardware processor 704 may be a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in one or more non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or additionally, computer system 700 may receive user input via a cursor control 716, such as a mouse, a trackball, a trackpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Alternatively or additionally, computer system 7 may include a touchscreen. Display 712 may be configured to receive user input via one or more pressure-sensitive sensors, multi-touch sensors, and/or gesture sensors. Alternatively or additionally, computer system 700 may receive user input via a microphone, video camera, and/or some other kind of user input device (not shown).

Computer system 700 may implement the techniques described herein using customized hard-wired logic, one or more ASICs or FPGAs, firmware, and/or program logic which in combination with other components of computer system 700 causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 700 may receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor 704 as it is received, and/or stored in storage device 710, or other non-volatile storage for later execution.

VII. Networks and Cloud Computing

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant IDs. Additionally or alternatively, data structures and/or datasets, stored by the computer network, are tagged with tenant IDs. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:

during execution of an autonomous agent configured to control operation of a physical mechanism, obtaining one or more current observations of a physical environment;

based at least on one of the one or more current observations of the physical environment, generating a trajectory tree that represents a plurality of possible trajectories in a belief space, wherein a belief about a discrete latent state can be represented by a probability distribution over the discrete latent state, wherein a plurality of nodes of the trajectory tree represents values of one or more continuous controls used by the autonomous agent to control the physical mechanism, wherein branches between nodes represent possible outcomes, possible observations, and beliefs over the one or more discrete latent states;

wherein a first node of the plurality of nodes represents a first control, and a second node of the plurality of nodes represents a second control which is a function of at least the values of a first possible outcome of the possible outcomes, a first possible observation of the possible observations, and a first belief, of the beliefs over the one or more discrete latent states, wherein the first belief, the first possible outcome, and the first possible observation correspond to a first branch between the first and second node, and wherein each node of the plurality of nodes is associated with one of a plurality of timesteps along the plurality of possible trajectories;

wherein generating the trajectory tree comprises:

(a) in a first forward pass, initializing one or more values of the one or more continuous controls for the plurality of nodes;

(b) responsive to completing the first forward pass, in a backward pass, starting at a plurality of leaf nodes in the plurality of nodes, propagating results of a derivative function from the plurality of leaf nodes, through one or more parent nodes, to a root node, where a parent node of a leaf node is a node in the plurality of nodes sharing a branch with the leaf node, and a root node is a node in the plurality of nodes without a parent node, wherein the derivative function comprises computing a derivative of a value function with respect to a state or control, wherein the value function comprises computing an expected sum of costs of each node in a trajectory up to the finite horizon of the trajectory tree, the expected sum of costs corresponding to the value of the trajectory, wherein a cost of a node in a trajectory is a value indicating the undesirability of a control value at the node of the trajectory;

(c) responsive to completing the backward pass, in a second forward pass, applying an optimization function to values of the one or more continuous controls, based at least on the results of the derivative function; and (d) updating the values of the one or more continuous controls by applying the locally optimal control modification to the values of the one or more continuous controls; and determining a current value of a continuous control of the one or more continuous controls associated with a current node of the plurality of nodes; and applying the current value of the continuous control to operation of the physical mechanism.

2. The one or more non-transitory computer-readable media of claim 1, wherein (b) and (c), and (d) are repeated iteratively until an optimization termination criterion is satisfied.

3. The one or more non-transitory computer-readable media of claim 1, wherein the first forward pass comprises generating the plurality of nodes at least by:

(i) generating a root node of the trajectory tree, based on at least one of the one or more current observations;

(ii) determining one or more maximum likelihood outcomes for one or more values of the one or more discrete latent states;

(iii) determining one or more maximum likelihood observations associated with the one or more maximum likelihood outcomes;

(iv) determining one or more beliefs associated with the one or more maximum likelihood outcomes and the one or more maximum likelihood observations;

(v) generating a plurality of child nodes of the root node, wherein a branch connecting a child node of the plurality of child nodes to a parent node corresponds to a maximum likelihood outcome of the one or more maximum likelihood outcomes, a maximum likelihood observation of the one or more maximum likelihood observations, and a belief associated with the maximum likelihood outcome and the maximum likelihood observation; and (vi) performing (ii), (iii), (iv), and (v) recursively, starting at the plurality of child nodes of the root node, until a finite horizon is reached.

4. The one or more non-transitory computer-readable media of claim 1, wherein the first forward pass comprises generating the plurality of nodes at least by:

(i) generating a root node of the trajectory tree, based on at least one of the one or more current observations;

(ii) sampling one or more possible discrete latent states of the one or more discrete latent states from a belief;

(iii) sampling one or more possible outcomes associated with the one or more possible discrete latent states;

(iv) sampling one or more possible observations associated with the one or more possible outcomes;

(v) determining one or more beliefs associated with the one or more possible outcomes and the one or more possible observations;

(vi) generating one or more child nodes of the root node, wherein a branch connecting a child node of the one or more child nodes to a parent node corresponds to a possible outcome of the one or more possible outcomes, a possible observation of the one or more possible observations, and the possible belief associated with the possible outcome and the possible observation; and (vii) performing (ii), (iii), (iv), (v), and (vi) recursively, starting at the one or more child nodes of the root node, until a finite horizon is reached.

5. The one or more non-transitory computer-readable media of claim 1, wherein generating the trajectory tree comprises updating values in a preexisting data structure that represents the trajectory tree.

6. The one or more non-transitory computer-readable media of claim 1, wherein timesteps associated with the plurality of nodes are separated by time intervals that are greater than a sampling rate used by one or more autonomous agent sensors providing values of the one or more current observations.

7. The one or more non-transitory computer-readable media of claim 1, wherein one or more continuous states of the set of continuous states are partially-observable.

8. The one or more non-transitory computer-readable media of claim 1, wherein at least one of the discrete latent states of the one or more discrete latent states is multimodal.

9. The one or more non-transitory computer-readable media of claim 1, wherein the physical mechanism is a steering mechanism of a vehicle.

10. The one or more non-transitory computer-readable media of claim 1, wherein the belief space comprises latent intentions of other agents operating in the physical environment, wherein the latent intentions of other agents are conditioned by the other agent's situational awareness level or intention to cooperate, wherein the other agent's situational awareness or intention to cooperate are determined by applying an intelligent driver model.

11. One or more non-transitory computer-readable media storing instructions that, when executed by one or more processors, cause the one or more processors to perform operations comprising:
   during execution of an autonomous agent configured to control operation of a physical mechanism, obtaining one or more current observations of a physical environment;
   based at least on one of the one or more current observations, generating a trajectory tree that represents a plurality of possible trajectories in a belief space, wherein a belief about a discrete latent state can be represented by a probability distribution over the discrete latent state;
      wherein a plurality of nodes of the trajectory tree represents values of one or more continuous controls,
      wherein branches between nodes represent possible outcomes, possible observations, and beliefs over one or more discrete latent states;
      wherein a first node of the plurality of nodes represents a first control, and a second node of the plurality of nodes represents a second control which is a function of at least the values of a first possible outcome of the possible outcomes, a first possible observation of the possible observations, and a first belief, of the beliefs over the one or more discrete latent states,
      wherein the first belief, the first possible outcome, and the first possible observation correspond to a first branch between the first and second node;
   determining that a current observation corresponds most closely to a closest-fit branch in
      (a) in a first forward pass, initializing one or more values of the one or more continuous controls for the plurality of nodes;
      (b) responsive to completing the first forward pass, in a backward pass, starting at a plurality of leaf nodes in the plurality of nodes, propagating results of a derivative function from the plurality of leaf nodes, through one or more parent nodes, to a root node, where a parent node of a leaf node is a node in the plurality of nodes sharing a branch with the leaf node, and a root node is a node in the plurality of nodes without a parent node,
      wherein the derivative function comprises computing a derivative of a value function with respect to a state or control,
      wherein the value function comprises computing an expected sum of costs of each node in a trajectory up to the finite horizon of the trajectory tree, the expected sum of costs corresponding to the value of the trajectory,
      wherein a cost of a node in a trajectory is a value indicating the undesirability of a control value at the node of the trajectory; and
      (c) responsive to completing the backward pass, in a second forward pass, applying an optimization function to values of the one or more continuous controls, based at least on the results of the derivative function;
      (d) updating the values of the one or more continuous controls by applying the locally optimal control modification to the values of the one or more continuous controls;
   a plurality of branches between a parent node and a closest-fit child node of the plurality of nodes;
   obtaining a value of a continuous control of the one or more continuous controls associated with the closest-fit child node; and
   applying a continuous control value, derived from the value of the continuous control associated with the closest-fit child node, to operation of the physical mechanism.

12. The one or more non-transitory computer-readable media of claim 11, wherein (b) and (c) and (d) are repeated iteratively until an optimization termination criterion is satisfied.

13. The one or more non-transitory computer-readable media of claim 11, wherein the first forward pass comprises generating the plurality of nodes at least by:
   (i) generating a root node of the trajectory tree, based on at least one of the one or more current observations;
   (ii) determining one or more maximum likelihood outcomes for one or more values of a latent state of the one or more discrete latent states;
   (iii) determining one or more maximum likelihood observations associated with the one or more maximum likelihood outcomes;
   (iv) determining one or more beliefs associated with the one or more maximum likelihood outcomes and the one or more maximum likelihood observations;
   (v) generating a plurality of child nodes of the root node, wherein a branch connecting a child node of the plurality of child nodes to a parent node corresponds to a maximum likelihood outcome of the one or more maximum likelihood outcomes, the maximum likelihood observation of the one or more maximum likelihood observations, and a belief associated with the maximum likelihood outcome and the maximum likelihood observation; and
   (vi) performing (ii), (iii), (iv), and (v) recursively, starting at the plurality of child nodes of the root node, until a finite horizon is reached.

14. The one or more non-transitory computer-readable media of claim 11, wherein the first forward pass comprises generating the plurality of nodes at least by:
   (i) generating a root node of the trajectory tree, based on at least one of the one or more current observations;
   (ii) sampling one or more possible discrete latent states of the one or more discrete latent states from a belief;

(iii) sampling one or more possible outcomes associated with the one or more possible discrete latent states;

(iv) sampling one or more possible observations associated with the one or more possible outcomes;

(v) determining one or more beliefs associated with the one or more possible outcomes and the one or more possible observations;

(vi) generating one or more child nodes of the root node, wherein a branch connecting a child node of the one or more child nodes to a parent node corresponds to a possible outcome of the one or more possible outcomes, a possible observation of the one or more possible observations, and a belief associated with the possible outcome and the possible observation; and (vii) performing (ii), (iii), (iv), (v), and (vi) recursively, starting at the one or more child nodes of the root node, until a finite horizon is reached.

15. The one or more non-transitory computer-readable media of claim 11, the operations further comprising:

adjusting the current value of the continuous control based at least on a difference between the current observation and a predicted value of the continuous observation.

16. The one or more non-transitory computer-readable media of claim 11, wherein timesteps associated with the plurality of nodes are separated by time intervals that are greater than a sampling rate used by one or more autonomous agent sensors providing values of the one or more current observations.

17. The one or more non-transitory computer-readable media of claim 11, wherein one or more continuous states of the set of continuous states are partially-observable.

18. The one or more non-transitory computer-readable media of claim 11, wherein at least one of the discrete latent states is multimodal.

19. The one or more non-transitory computer-readable media of claim 11, wherein the physical mechanism is a steering mechanism of a vehicle.

20. The one or more non-transitory computer-readable media of claim 3, wherein the belief is based on one or more of the one or more current observations or on a possible observation of the possible observations.

21. The one or more non-transitory computer-readable media of claim 1, wherein every parent node has a plurality of child nodes.

22. The one or more non-transitory computer-readable media of claim 11, wherein the belief space comprises latent intentions of other agents operating in the physical environment, wherein the latent intentions of other agents are conditioned by the other agent's situational awareness level or intention to cooperate, wherein the other agent's situational awareness or intention to cooperate are determined by applying an intelligent driver model.

* * * * *